US012784930B2

(12) United States Patent
Huang et al.

(10) Patent No.: US 12,784,930 B2
(45) Date of Patent: Nov. 3, 2026

(54) COMPOSITE CONDUCTORS INCLUDING STRENGTH MEMBERS HAVING A CONDUCTIVE CORE

(71) Applicant: TS Conductor Corp., Huntington Beach, CA (US)

(72) Inventors: Jianzhong Jason Huang, San Clemente, CA (US); Rulong Chen, San Clemente, CA (US)

(73) Assignee: TS Conductor Corp., Huntington Beach, CA (US)

( * ) Notice: Subject to any disclaimer, the term of this patent is extended or adjusted under 35 U.S.C. 154(b) by 196 days.

(21) Appl. No.: 18/630,819

(22) Filed: Apr. 9, 2024

(65) Prior Publication Data

US 2024/0347227 A1 Oct. 17, 2024

Related U.S. Application Data

(60) Provisional application No. 63/495,352, filed on Apr. 11, 2023.

(51) Int. Cl.

*H01B 1/24* (2006.01)
*H01B 5/10* (2006.01)
*H01B 7/00* (2006.01)
*H01B 9/00* (2006.01)

(52) U.S. Cl.

CPC ............... *H01B 1/24* (2013.01); *H01B 5/102* (2013.01); *H01B 7/0009* (2013.01); *H01B 9/006* (2013.01)

(58) Field of Classification Search

CPC ........................................................ H01B 1/24
See application file for complete search history.

(56) References Cited

U.S. PATENT DOCUMENTS 1,794,269 A 2/1931 Johann
3,176,285 A 3/1965 Eliezer
3,378,631 A 4/1968 Thomas
3,674,915 A 7/1972 Pritchard
(Continued)

FOREIGN PATENT DOCUMENTS

CN 101002288 A 7/2007
CN 200990254 Y 12/2007
(Continued)

OTHER PUBLICATIONS

International Preliminary Report on Patentability for Application No. PCT/US2023/077651, dated Apr. 29, 2025, 16 pages.
(Continued)

*Primary Examiner* — Chau N Nguyen
(74) *Attorney, Agent, or Firm* — COOLEY LLP

(57) ABSTRACT

An apparatus comprises a strength member including a core formed of a composite material. A plurality of conductive elements are included in the composite material causing the core to be conductive. The strength member may optionally, also include an encapsulation layer disposed around the core. A conductor layer is disposed around the strength member. The plurality of conductive elements may include at least one of conductive fibers, conductive filaments, or conductive tows. The plurality of conductive fibers, conductive filaments, or conductive tows may include at least one of carbon nanotubes or graphene.

16 Claims, 4 Drawing Sheets

(56) References Cited

U.S. PATENT DOCUMENTS

| | | | | |
|---|---|---|---|---|
| 3,717,720 | A | 2/1973 | Snellman | |
| 3,749,813 | A | 7/1973 | Shealy | |
| 3,813,481 | A | 5/1974 | Adams | |
| 3,813,772 | A | 6/1974 | Adams | |
| 4,020,277 | A | 4/1977 | La Chance, Sr. et al. | |
| 4,149,367 | A | 4/1979 | Eistrat | |
| 4,436,954 | A | 3/1984 | Kaderjak et al. | |
| 5,243,137 | A | 9/1993 | Gentry | |
| 5,808,238 | A | 9/1998 | Munakata et al. | |
| 6,127,625 | A | 10/2000 | Castano | |
| 6,147,303 | A | 11/2000 | Abe et al. | |
| 6,191,354 | B1 | 2/2001 | Castano et al. | |
| 6,241,920 | B1 | 6/2001 | Cotter et al. | |
| 7,015,395 | B2 | 3/2006 | Goldsworthy et al. | |
| 7,019,217 | B2 | 3/2006 | Bryant | |
| 7,041,909 | B2 | 5/2006 | Hiel et al. | |
| 7,060,326 | B2 | 6/2006 | Hiel et al. | |
| 7,179,522 | B2 | 2/2007 | Hiel et al. | |
| 7,188,406 | B2 | 3/2007 | Varkey et al. | |
| 7,211,319 | B2 | 5/2007 | Hiel et al. | |
| 7,368,162 | B2 | 5/2008 | Hiel et al. | |
| 7,438,971 | B2 | 10/2008 | Bryant et al. | |
| 7,563,983 | B2 | 7/2009 | Bryant | |
| 7,608,783 | B2 | 10/2009 | Bryant et al. | |
| 7,622,681 | B2 | 11/2009 | Kikuchi et al. | |
| 8,022,301 | B2 | 9/2011 | Bryant et al. | |
| 9,032,809 | B2 | 5/2015 | Kemnitz et al. | |
| 9,093,191 | B2 | 7/2015 | Hiel et al. | |
| 9,167,736 | B2 * | 10/2015 | Shah | H01B 3/004 |
| 9,328,245 | B2 | 5/2016 | Siripurapu et al. | |
| 9,595,368 | B2 | 3/2017 | Ranganathan et al. | |
| 9,633,766 | B2 | 4/2017 | Huang | |
| 9,685,257 | B2 | 6/2017 | Daniel et al. | |
| 9,741,467 | B2 | 8/2017 | Ranganathan et al. | |
| 9,859,038 | B2 | 1/2018 | Davis et al. | |
| 9,923,111 | B2 | 3/2018 | Fan et al. | |
| 9,969,619 | B2 * | 5/2018 | Sundaram | B82Y 40/00 |
| 10,088,251 | B2 | 10/2018 | Raman et al. | |
| 10,304,586 | B2 | 5/2019 | Huang | |
| 10,332,658 | B2 | 6/2019 | Mhetar et al. | |
| 10,395,794 | B2 | 8/2019 | Meyer et al. | |
| 10,586,633 | B2 | 3/2020 | Davis et al. | |
| 10,726,975 | B2 | 7/2020 | Ranganathan et al. | |
| 10,886,036 | B2 | 1/2021 | Huang | |
| 10,941,990 | B2 | 3/2021 | Raman et al. | |
| 10,957,467 | B2 | 3/2021 | Ranganathan et al. | |
| 11,169,323 | B2 | 11/2021 | Tomblin et al. | |
| 11,329,467 | B2 | 5/2022 | Bosze et al. | |
| 11,335,478 | B2 | 5/2022 | Varkey et al. | |
| 11,745,624 | B2 | 9/2023 | Bosze et al. | |
| 11,854,721 | B2 | 12/2023 | Huang et al. | |
| 11,977,109 | B2 | 5/2024 | Dong et al. | |
| 12,136,804 | B2 | 11/2024 | Pilling | |
| 12,253,555 | B2 | 3/2025 | Dong et al. | |
| 12,261,422 | B2 | 3/2025 | Webb et al. | |
| 12,394,961 | B2 | 8/2025 | Huang et al. | |
| 2004/0026112 | A1 | 2/2004 | Goldsworthy et al. | |
| 2005/0181228 | A1 | 8/2005 | McCullough et al. | |
| 2005/0186410 | A1 | 8/2005 | Bryant et al. | |
| 2005/0279527 | A1 | 12/2005 | Johnson et al. | |
| 2007/0193767 | A1 * | 8/2007 | Guery | H01B 5/105<br>174/106 R |
| 2008/0233380 | A1 | 9/2008 | Hiel et al. | |
| 2009/0255706 | A1 * | 10/2009 | Jiang | H01B 11/1808<br>174/102 R |
| 2010/0059249 | A1 | 3/2010 | Powers | |
| 2010/0163275 | A1 | 7/2010 | Hiel et al. | |
| 2010/0181012 | A1 | 7/2010 | Hiel et al. | |
| 2011/0204297 | A1 | 8/2011 | Park et al. | |
| 2012/0090892 | A1 | 4/2012 | Meyer et al. | |
| 2012/0261158 | A1 | 10/2012 | Daniel et al. | |
| 2012/0267141 | A1 * | 10/2012 | Kamiyama | C22F 1/04<br>977/932 |
| 2012/0305312 | A1 | 12/2012 | McCullough et al. | |
| 2013/0101845 | A9 | 4/2013 | Hiel et al. | |
| 2015/0008030 | A1 | 1/2015 | Couture | |
| 2015/0104641 | A1 | 4/2015 | Mhetar et al. | |
| 2015/0194240 | A1 | 7/2015 | Ranganathan et al. | |
| 2015/0353737 | A1 | 12/2015 | Siripurapu et al. | |
| 2015/0374477 | A1 | 12/2015 | Chang et al. | |
| 2016/0099090 | A1 | 4/2016 | Huang | |
| 2016/0181771 | A1 | 6/2016 | Kwon | |
| 2017/0117695 | A1 | 4/2017 | Sarti et al. | |
| 2017/0137659 | A1 | 5/2017 | Ranganathan et al. | |
| 2017/0178764 | A1 | 6/2017 | Huang | |
| 2017/0314878 | A1 | 11/2017 | Raman et al. | |
| 2018/0025809 | A1 | 1/2018 | Ranganathan et al. | |
| 2018/0156848 | A1 | 6/2018 | Ospina Ramirez et al. | |
| 2018/0211746 | A1 | 7/2018 | Ranganathan et al. | |
| 2018/0361879 | A1 | 12/2018 | Bosze et al. | |
| 2019/0295739 | A1 | 9/2019 | Huang | |
| 2020/0208854 | A1 | 7/2020 | Johnson et al. | |
| 2020/0333047 | A1 | 10/2020 | Raman et al. | |
| 2020/0411210 | A1 | 12/2020 | Bosze et al. | |
| 2021/0048469 | A1 | 2/2021 | Dong et al. | |
| 2021/0219463 | A1 | 7/2021 | Raman et al. | |
| 2021/0246320 | A1 | 8/2021 | Coogan et al. | |
| 2022/0146563 | A1 | 5/2022 | Dong et al. | |
| 2022/0184733 | A1 | 6/2022 | Mori | |
| 2022/0221676 | A1 | 7/2022 | Maida et al. | |
| 2022/0385055 | A1 | 12/2022 | Dong et al. | |
| 2023/0178267 | A1 | 6/2023 | Webb et al. | |
| 2023/0307155 | A1 | 9/2023 | Huang et al. | |
| 2024/0079861 | A1 | 3/2024 | Huang et al. | |
| 2024/0103239 | A1 | 3/2024 | Webb et al. | |
| 2024/0136088 | A1 | 4/2024 | Huang et al. | |
| 2024/0154399 | A1 | 5/2024 | Webb et al. | |
| 2024/0290519 | A1 | 8/2024 | Huang et al. | |
| 2025/0140443 | A1 | 5/2025 | Huang et al. | |
| 2025/0277841 | A1 | 9/2025 | Dong et al. | |
| 2026/0002800 | A1 | 1/2026 | Corbalis et al. | |
| 2026/0121388 | A1 | 4/2026 | Huang et al. | |

FOREIGN PATENT DOCUMENTS

| | | | |
|---|---|---|---|
| CN | 201142240 | Y | 10/2008 |
| CN | 102024517 | A | 4/2011 |
| CN | 102045517 | A | 5/2011 |
| CN | 102103896 | A | 6/2011 |
| CN | 102290143 | A | 12/2011 |
| CN | 202839095 | U | 3/2013 |
| CN | 203406087 | U | 1/2014 |
| CN | 203850022 | U | 9/2014 |
| CN | 105788738 | A | 7/2016 |
| EP | 1135879 | A1 | 9/2001 |
| EP | 1821318 | A2 | 8/2007 |
| EP | 1506085 | B1 | 12/2016 |
| EP | 3178095 | A1 | 6/2017 |
| EP | 3743273 | A1 | 12/2020 |
| EP | 3759454 | A1 | 1/2021 |
| EP | 3762949 | A1 | 1/2021 |
| EP | 3129991 | B1 | 3/2021 |
| EP | 3400601 | B1 | 7/2021 |
| EP | 3935364 | A2 | 1/2022 |
| EP | 4005045 | A2 | 6/2022 |
| EP | 4078750 | A1 | 10/2022 |
| EP | 4143859 | A1 | 3/2023 |
| EP | 4150727 | A1 | 3/2023 |
| EP | 4302147 | A1 | 1/2024 |
| EP | 4302317 | A1 | 1/2024 |
| EP | 4303889 | A1 | 1/2024 |
| EP | 4273892 | B1 | 2/2025 |
| EP | 4542584 | A2 | 4/2025 |
| EP | 4118407 | B1 | 5/2025 |
| EP | 4594764 | A1 | 8/2025 |
| EP | 4619710 | A1 | 9/2025 |
| EP | 3762949 | B1 | 12/2025 |
| EP | 4689680 | A1 | 2/2026 |
| IT | 202000005347 | A1 | 9/2021 |
| IT | 202200014380 | A1 | 1/2024 |
| JP | 2001291429 | A | 10/2001 |
| JP | 2007527098 | A | 9/2007 |
| KR | 20110025997 | A | 3/2011 |
| KR | 20140027252 | A | 3/2014 |

(56) References Cited

FOREIGN PATENT DOCUMENTS

| | | | |
|---|---|---|---|
| KR | 20180089796 | * | 8/2018 |
| WO | WO-02098996 | A1 | 12/2002 |
| WO | WO-2003091008 | A1 | 11/2003 |
| WO | WO-2007034248 | A1 | 3/2007 |
| WO | WO-2010136062 | A1 | 12/2010 |
| WO | WO-2014025420 | A1 | 2/2014 |
| WO | WO-2014164707 | A2 | 10/2014 |
| WO | WO-2015105972 | A1 | 7/2015 |
| WO | WO-2015155728 | A1 | 10/2015 |
| WO | WO-2016046790 | A1 | 3/2016 |
| WO | WO-2017100762 | A1 | 6/2017 |
| WO | WO-2019147838 | A1 | 8/2019 |
| WO | WO-2019168998 | A1 | 9/2019 |
| WO | WO-2019173414 | A1 | 9/2019 |
| WO | WO-2020181248 | A2 | 9/2020 |
| WO | WO-2021016569 | A2 | 1/2021 |
| WO | WO-2021127659 | A1 | 6/2021 |
| WO | WO-2021181265 | A1 | 9/2021 |
| WO | WO-2021222663 | A1 | 11/2021 |
| WO | WO-2021225986 | A1 | 11/2021 |
| WO | WO-2021225989 | A1 | 11/2021 |
| WO | WO-2021225990 | A1 | 11/2021 |
| WO | WO-2021225992 | A1 | 11/2021 |
| WO | WO-2021225995 | A1 | 11/2021 |
| WO | WO-2021232026 | A1 | 11/2021 |
| WO | WO-2021232027 | A1 | 11/2021 |
| WO | WO-2022186854 | A1 | 9/2022 |
| WO | WO-2022187750 | A1 | 9/2022 |
| WO | WO-2023192807 | A1 | 10/2023 |
| WO | WO-2023212610 | A1 | 11/2023 |
| WO | WO-2024073773 | A1 | 4/2024 |
| WO | WO-2024091951 | A1 | 5/2024 |
| WO | WO-2024108183 | A1 | 5/2024 |
| WO | WO-2024211858 | A1 | 10/2024 |
| WO | WO-2024215679 | A1 | 10/2024 |
| WO | WO-2025212131 | A1 | 10/2025 |

OTHER PUBLICATIONS

Notice of Allowance for U.S. Appl. No. 18/307,657, dated Apr. 24, 2025, 11 pages.

Invitation to pay additional fees for International Application No. PCT/US2024/023743 dated Jul. 29, 2024, 10 pages.

Atiganyanun, "Use of hollow silica and titanium dioxide microparticles in solar reflective paints for daytime radiative cooling applications in a tropical region," Journal of Photonics for Energy, vol. 11(2), Apr.-Jun. 2021,14 pages.

[Author Unknown] "Application Note, Microbending & Macrobending Power Losses in Optical Fibers". AFL Hyperscale, white paper, [date unknown], 4 pages.

[Author Unknown] "Hendrix Covered Conductor Manual". Western Power, ABN 18540492861, Rev Aug. 2-8, 2013, DM#: 5523521,56 pages.

[Author Unknown] "Messenger Wire—Spacer Cable Systems". Hendrix Aerial Cable Systems, Marmon Utility LLC, [date unknown], 1 page.

Bosta et al., "Influence of electrolyte temperature on properties and infrared emissivity of MAO ceramic coating on 6061 aluminum alloy," Infrared Physics & Technology, vol. 67, 2014, pp. 63-72.

Chen et al., "Passive daytime radiative cooling: Fundamentals, material designs, and applications," EcoMat, vol. 4:e12153, 2022, 28 pages.

Chen Y., et al., "Beyond 85° C.: Thermal Aging Impact on Optical Fiber with Corning® CPC® Coatings", Jun. 1, 2017 (Jun. 1, 2017), pp. 1-12, Retrieved from the Internet: URL:https://www.corning.com/media/worldwide/coc/documents/Fiber/white-paper/WP4250.pdf [retrieved on Feb. 7, 2024], XP093128604.

Dexmat, "Galvorn 199 Filament CNT Fiber Tow," Product Sheet, Sep. 2022, 1 page.

Dexmat, "Galvorn 37 Filament CNT Fiber Tow," Product Sheet, Sep. 2022, 1 page.

Glisic, et al., "Piles monitoring during the axial compression, pullout and flexure test using fiberoptic sensors". Transportation Research Board (TRB), Record 1808, Paper No. 02-2701 (2002); 1808(1): 11-20.

Gunday, et al., "Optical fiber distributed sensing of temperature, thermal strain and thermo-mechanical force formations on OPGW cables under wind effects". 2013 8th International Conference on Electrical and Electronics Engineering (ELECO), Bursa, Turkey, 2013, pp. 462-467, 7 pages.

Huang et al., "Scalable Aqueous Processing-Based Passive Daytime Radiative Cooling Coatings," Advanced Functional Materials, vol. 31,2021,7 pages.

Hyosung Corporation, "Hyosung carbon fiber products are high strength (H2550, 12k/24k) and intermediate modulus. (H3055, 12k)," Product Sheet, Nov. 2012, 1 page.

Inaudi, et al., "Overview of Fibre Optic Sensing Applications to Structural Health Monitoring", 13th FIG Symposium on Deformation Measurement and Analysis, 4th IAG Symposium on Geodesy for Geotechnical and Structural Engineering, LNEC, Lisbon May 12-15, 2008, Smartec SA, Switzerland, 10 pages.

International Search Report and Written Opinion for International Application No. PCT/US2023/064922 dated Jun. 28, 2023, 13 pages.

International Search Report and Written Opinion for PCT Application No. PCT/US2023/066257 dated Aug. 10, 2023, 14 pages.

International Search Report and Written Opinion of the International Searching Authority for International Application No. PCT/US2023/077651, dated Apr. 11, 2024, 26 pages.

Invitation to pay additional fees for International Application No. PCT/US2023/077651 dated Feb. 21, 2024, 22 pages.

Jay, John A., "An overview of Macro-bending and Micro-bending of optical fiber", Corning Incorporated, Dec. 2010, WP1212, 21 pages.

Mandal et al., "Hierarchically porous polymer coatings for highly efficient passive daytime radiative cooling," Science, vol. 362, 2018, pp. 315-319.

Mandal et al., "Paints as a Scalable and Effective Radiative Cooling Technology for Buildings," Joule, vol. 4, Jul. 15, 2020, pp. 1350-1356.

Non Final Office Action for U.S. Appl. No. 18/189,726 dated Jul. 10, 2023, 10 pages.

Non-Final Office Action for U.S. Appl. No. 18/388,638 mailed Jun. 21, 2024, 14 pages.

Trager, Brian J., "Medium Voltage Line Design—A Covered Conductor Alternative for Long Spans and River Crossings". Hendrix Overhead Systems, Marmon Utility LLC, [date unknown], 10 pages.

Ukil, et al., "Distributed Temperature Sensing: Review of Technology and Applications". IEEE Sensors Journal, vol. 12, Issue: 5, May 2012, pp. 885-892, arXiv: 1503.06261 v1 [physics, ins-det].

Wikipedia., "Optical ground wire", Feb. 25, 2022 (Feb. 25, 2022), pp. 1-2, Retrieved from the Internet: URL: https://en.wikipedia.org/w/index.php?title=Optical_ground_wire&oldid=1072089888[retrieved on Jan. 30, 2024], XP093125543.

Yang et al., "Optical emission spectroscopy of plasma electrolytic oxidation process on 7075 aluminum alloy," Surface & Coatings Technology, vol. 324, May 3, 2017, pp. 18-25.

Yang et al., "Passive daytime radiative cooling: Principle, application, and economic analysis," MRS Energy & Sustainability: A Review Journal, vol. 7, e18, 2020, 8 pages.

[Author Unknown] "A new aluminum conductor with a carbon fiber core has been patented." Deangeli Prodotti [blog]. Nov. 26, 2014, retrieved on Jun. 7, 2022. Retrieved from the internet, URL: <https://www.deangeliprodotti.com/en/articles/a-new-aluminum-conductor-with-a-carbon-fiber-core-has-been-patented/>, 6 pages.

[Author Unknown] "DuPont Kapton, Summary of Properties," DuPont™, 2022. [retrieved online] Retrieved from the internet on Mar. 6, 2025, 20 pages. Retrieved at URL: <https://www.dupont.com/content/dam/electronics/amer/us/en/electronics/public/documents/en/EI-10142_Kapton-Summary-of-Properties.pdf.>.

International Preliminary Report on Patentability for Application No. PCT/US2023/064922, dated Oct. 10, 2024, 6 pages.

(56) References Cited

OTHER PUBLICATIONS

International Preliminary Report on Patentability for Application No. PCT/US2023/066257, dated Nov. 7, 2024, 8 pages.
Non-Final Office Action for U.S. Appl. No. 18/307,657 dated Mar. 10, 2025, 15 pages.
International Search Report and Written Opinion for PCT Application No. PCT/US2024/023743 mailed Sep. 20, 2024, 16 pages.
PCT Application No. PCT/US2024/023743, International Preliminary Report on Patentability dated Oct. 23, 2025, Applicant TS Conductor Corp., 11 pages.
U.S. Appl. No. 18/383,308, Restriction Requirement mailed Mar. 6, 2026; Inventor Huang, Jianzhong Jason et al.; 6 pages.

* cited by examiner

FIG. 6

| TS Covered Options vs ACSR 1/0 Covered (GO-95) | Line Length (km): 10000; Voltage (kV): 15 | | | |
|---|---|---|---|---|
| | ACSR 1/0 Baseline | TS Covered | TS Bare | TS Conductive |
| | 54 - ACSR 1/0 Bare | 49 - TS 1/0 M4 3.5 (16.25) Covered | 49 - TS 1/0 M4 3.5 Bare | 58 - TS 1/0 M4 3.5 HC |
| **Diameter (mm):** | 10.11 | 16.25 | 8.63 | 9.36 |
| **Aluminum Area (mm²):** | 53.6 | 48.9 | 48.9 | 58.5 |
| **Rated Strength (kN):** | 19.9 | 33.5 | 33.5 | 34 |
| **Weight (kg/km):** | 214 | 290 | 147 | 173 |
| **DC Resistance at 20°C (ohms/km):** | 0.5366 | 0.5598 | 0.5598 | 0.4696 |
| **Ampacity (A) at Temperature (°C):** | Total Peak Operating Amps: 250; Load Factor: 0.75 | | | |
| Ampacity (A) at Rated Operating Temp (°C): | 276 (90 C) | 317 (105 C) | 286 (105 C) | 320 (105 C) |
| Ampacity (A) at Maximum Temp (°C): | 276 (90 C) | 362 (130 C) | 400 (200 C) | 362 (130 C) |
| **Sag/Tension** | 91.44/91.44/135/135 | | | |
| Maximum Thermal Sag (ft): | 0.94 (90 C) | 0.61 (130 C) | 0.57 (200 C) | 0.68 (130 C) |
| Span Distance (ft) | 300 | 300 | 390 | 300 |
| GO-95 Total Sag (m): | 0.52 | 0.91 | 0.93 | 0.99 |
| Total Pole Tension (Lbf): | 8.9 | 7.8 | 8.9 | 9.1 |
| % RTS: | 45% | 23% | 27% | 27% |
| **Line Losses (10000 km, 250 Peak Amps)** | Load Factor: 0.75; Cost of Energy Generation (USD$/MWh): 60 | | | |
| Resistance Value (ohm/km) | 0.668 | 0.695 | 0.713 | 0.576 |
| First Year Line Losses (MWh): | 6478115 | 6739922 | 6912329 | 5585357 |
| ine Loss Savings of Conductor (USD$/m/Year): | | | | $1.79 |
| Reduces 30 year line loss by (USD$): | | | | $1,606,964,526.71 |
| Reduces 30 year $CO_2$ generation by (MT): | | | | 26,600,547 |

COMPOSITE CONDUCTORS INCLUDING STRENGTH MEMBERS HAVING A CONDUCTIVE CORE

CROSS-REFERENCE TO RELATED APPLICATIONS

The present application claims priority to and the benefit of U.S. Provisional Application No. 63/495,352, filed Apr. 11, 2023, and entitled "Composite Conductors Including Strength Members Having a Conductive Core," the entire disclosure of which is incorporated herein by reference.

TECHNICAL FIELD

The embodiments described herein relate generally to conductors for use in grid transmission and distribution applications.

BACKGROUND

The electrical grid is a major contributor to greenhouse emissions and global warming. The US electrical grid is more than 25 years old and globally about 2,000 TWh electricity is wasted annually, and about 1 Billion Metric Ton of GHG emission is associated with compensatory generation. As the demand for electricity grows, there is an increased demand for higher capacity electricity transmission and distribution lines. The amount of power delivered by an electrical conductor is dependent on the current-carrying capacity (also referred to as the ampacity) of the conductor transmitting the electric current.

The US electrical grid today is still dominated by the Aluminum Conductor Steel-Reinforced (ACSR) conductor technology developed in 1908. The ACSR conductor has limited capacity and poor efficiency, and was the principle reason for bottlenecks to energy transmission observed in our electrical grid. In addition to the US electrical grid being old, the problems in energy transmission are further compounded by changing weather patterns, frequent extreme weathers and the demand for electricity from energy transition. The electrical grid infrastructure is built around fossil burning power plants, and electrical current (i.e., electrons) only need to travel on average of 200 miles or less. With renewable electrical energy generation being located typically in remote locations, the average travel distance for electrical energy is estimated to be 800 miles in the future. A recent research report forecasted a 50% EV adoption by 2035 in California, which will create significant pressure on distribution grid to support the charging infrastructure at least in that state.

SUMMARY

Embodiments described herein relate generally to systems and methods for electrical transmission using conductors having a conductive core and, in particular, to electrical conductors that include a strength member, including a composite core and optionally, an encapsulation layer disposed around the composite core, and a conductor layer(s) that may include a plurality of strands of a conductive material disposed around the strength member. A plurality of conductive elements are included in the composite core causing the core to be conductive. Providing a conductive composite core causes the conductors described herein to have lower resistance, higher ampacity, and lower line losses relative to comparable conductors that do not have conductive core(s) or have non-conductive core(s).

In some embodiments, an apparatus includes: a strength member, including: a core formed of a composite material, and a plurality of conductive elements are included in the composite material causing the core to be conductive. A conductor layer is disposed around the strength member. In some embodiments, the strength member may also include an encapsulation layer disposed around the core.

In some embodiments, an apparatus includes a strength member, including: a core formed of a composite material, and plurality of elongate conductive elements disposed in the core such that greater than 50% of the plurality of elongate conductive elements are disposed within less than 20% of a radial distance from an outer surface of the core to a central axis of the core; and a conductor layer disposed around the core.

In some embodiments, an electrical conductor includes: a strength member, including: an at least partially electrically conductive core including a bulk matrix formed of a composite material, and a plurality of elongate conductive elements embedded in the bulk matrix, and an encapsulating layer disposed around the core, the encapsulating layer formed of an electrically conductive material; and a conductor layer disposed around the strength member, the at least partially electrically conductive core causes the electrical conductor to have a resistance of less than 0.6 ohm/km.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6 is a table that lists various electrical and mechanical properties of example electrical conductors that include conductive composite cores according to the embodiments described herein, relative to comparable conductors that include a non-conductive core, and conventional ACSR conductors.

Figure 1:
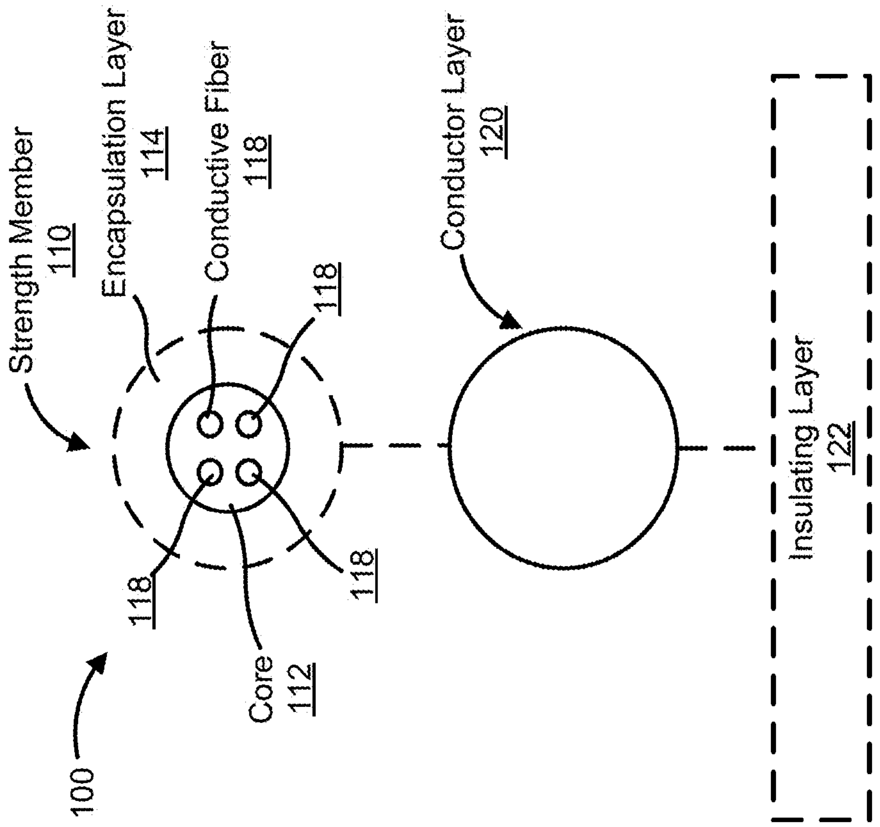
FIG. 1 is a schematic illustration of a conductor for use in grid electrical transmission that includes a strength member including a composite core that is conductive, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for electrical transmission using conductors having a conductive core and, in particular, to electrical conductors that include a strength member, including a composite core that may optionally include an encapsulation layer disposed around the composite core, and a conductor layer(s) that may include a plurality of strands of a conductive material disposed around the strength member. A plurality of conductive elements such as conductive fibers, conductive filaments, and/or conductive tows are included in the composite core causing the core to be conductive. Providing a conductive composite core causes the conductors described herein to have lower resistance, higher ampacity, and lower line losses relative to comparable conductors that do not have conductive core(s) or have non-conductive core(s).

The US electrical grid today is still dominated by the ACSR conductor technology developed in 1908. The ACSR conductor has limited capacity and poor efficiency, and was the principle reason for bottlenecks to energy transmission observed in our electrical grid. In addition to the US electrical grid being old, the problems in energy transmission are further compounded by changing weather patterns, frequent extreme weathers and the demand for electricity from energy transition. Thus, there is a need for new conductor technologies that have lower resistance, higher ampacity, and lower line losses.

Embodiments of the conductors described herein that include a strength member having a composite core including a plurality of conductive elements such that the core is conductive and optionally, include an encapsulation layer disposed around the core, may provide one or more benefits including, for example: 1) providing an increase in ampacity over conventional ACSR, Aluminum Conductor Steel Supported (ACSS) conductor, bare conductors, or conductors featuring composite core(s) that include non-conductive cores; 2) having a resistance in the conductive composite core that is equal to or less than 50% of a non-conductive composite core and/or having a ratio of a resistivity of the conductive composite core to that of a non-conductive composite core of equal to or less than 1:10, thus reducing line losses; 3) providing cost savings of greater than $1.6 Billion for a 10,000 km circuit over a period of 30 years by replacing conventional conductors with the conductors including a conductive composite core as described herein; 4) providing improved electrical characteristics without any significant increase in weight or sagging of the conductor, and additionally providing mechanical reinforcement to the conductor; 5) enabling doubling or tripling of line capacity by simply replacing conventional conductors in the electrical grid with the conductors including conductive cores described herein; 6) protecting the composite core of the strength member from moisture and/or solvents that may damage the composite core by providing the encapsulation layer therearound; 7) reducing greenhouse gas emissions by greater than 26 Million Megatons; and 8) improving performance of the conductors without impacting functionality, reliability, and/or performance of the conductor.

As used herein, the singular forms “a”, “an” and “the” include plural referents unless the context clearly dictates otherwise. Thus, for example, the term “a member” is intended to mean a single member or a combination of members, “a material” is intended to mean one or more materials, or a combination thereof.

As used herein, the terms “about” and “approximately” generally mean plus or minus 10% of the stated value. For example, about 0.5 would include 0.45 and 0.55, about 10 would include 9 to 11, about 1000 would include 900 to 1100.

As utilized herein, the terms “substantially” and similar terms are intended to have a broad meaning in harmony with the common and accepted usage by those of ordinary skill in the art to which the subject matter of this disclosure pertains. For example, the term “substantially flat” would mean that there may be de minimis amount of surface variations or undulations present due to manufacturing variations present on an otherwise flat surface. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms “coupled,” and the like as used herein mean the joining of two members directly or indirectly to one another. Such joining may be stationary (e.g., permanent) or moveable (e.g., removable, or releasable). Such joining may be achieved with the two members or the two members and any additional intermediate members being integrally formed as a single unitary body with one another or with the two members or the two members and any additional intermediate members being attached to one another.

As described herein, the term “conductive fibers” is used to describe thin, thread-like structures formed from or including a conductive materials, which can vary in length and diameter, and can be natural or synthetic.

As described herein, the term “conductive filaments” is used to describe thin and thread-like structures formed from conductive material, but that are typically longer and continuous relative to conductive fibers, and are produced using various manufacturing processes, including extrusion and spinning.

As described herein, the term “conductive tows” is used to describe a bundle of conductive filaments or conductive fibers that are twisted or bound together such that the individual filaments or fibers in the tow are typically not separated, and the tow is used as a single unit.

FIG. 1 is a schematic illustration of a conductor 100, according to an embodiment. The conductor 100 includes a strength member 110, a conductor layer 120 disposed around the strength member 110, and optionally, an insulating layer or jacket 122 disposed on the conductor layer 120.

The strength member 110 includes a core 112 and optionally, an encapsulation layer 114 disposed around the core 112, for example, disposed circumferentially around the core 112. In some embodiments in which the encapsulation layer 114 is present, the conductor layer 120 is disposed on the encapsulation layer 114. In some embodiments in which the encapsulation layer 114 is absent, the conductor layer 120 may be disposed directly on the core 112.

The core 112 may be formed from a composite material. In some embodiments, the composite material may include nonmetallic fiber reinforced metal matrix composite, carbon fiber reinforced composite of either thermoplastic or thermoset matrix or even metallic matrix, or composites reinforced with other types of fibers such as quartz, AR-Glass, E-Glass, S-Glass, H-Glass, silicon carbide, silicon nitride, alumina, basalt fibers, specially formulated silica fibers, any other suitable composite material, or any combination thereof. In some embodiments, the composite material includes a carbon fiber reinforced composite of a thermoplastic or thermoset resin. The reinforcement in the composite strength member(s) can be discontinuous such as whiskers or chopped fibers, or continuous fibers in substantially aligned configurations (e.g., parallel to axial direction) or randomly dispersed (including helically wind or woven configurations). In some embodiments, the composite material may include a continuous or discontinuous polymeric matrix composites reinforced by carbon fibers, glass fibers, quartz, ceramic fibers such as alumina fibers, or other reinforcement materials, and may further include fillers or additives (e.g., nanoadditives). In some embodiments, the core 112 may include a carbon composite including a polymeric matrix of epoxy resin cured with anhydride hardeners.

Additionally, a plurality of conductive elements 118 are disposed in the core 112, for example, longitudinal conductive elements that extend along a longitudinal axis. Such conductive elements 118 may include, but are not limited to conductive fibers, conductive filaments, and/or conductive tows. For example, the plurality of conductive elements 118 may be embedded in the core 112, distributed uniformly (e.g., evenly distributed throughout a cross-section of the core 112), distributed randomly (e.g., distributed in the core 112 in no particular order) in the core 112, distributed in the core 112 in an asymmetric manner, mixed in with the composite material used to form the core 112, or are otherwise included in the core 112.

For example, in some embodiments, the plurality of conductive elements 118 may be distributed in the core 112 such that a higher concentration of the conductive elements 118 is present proximate to an outer surface of the core 112 relative to a concentration of the conductive elements proximate to a central axis of the core 112. In some embodiments, greater than 50% of a total amount of the plurality of conductive elements 118 may be located within less than 20% of a radial distance from the outer surface of the core 112 to the central axis of the core 112. In some embodiments, greater than 55% of a total amount of the plurality of conductive elements 118 may be located within less than 20% of a radial distance from the outer surface of the core 112 to the central axis of the core 112. In some embodiments, greater than 60% of a total amount of the plurality of conductive elements 118 may be located within less than 20% of a radial distance from the outer surface of the core 112 to the central axis of the core 112. In some embodiments, greater than 65% of a total amount of the plurality of conductive elements 118 may be located within less than 20% of a radial distance from the outer surface of the core 112 to the central axis of the core 112. In some embodiments, greater than 70% of a total amount of the plurality of conductive elements 118 may be located within less than 20% of a radial distance from the outer surface of the core 112 to the central axis of the core 112. In some embodiments, greater than 75% of a total amount of the plurality of conductive elements 118 may be located within less than 20% of a radial distance from the outer surface of the core 112 to the central axis of the core 112. In some embodiments, greater than 80% of a total amount of the plurality of conductive elements 118 may be located within less than 20% of a radial distance from the outer surface of the core 112 to the central axis of the core 112.

Having a larger number of conductive elements 118 located proximate to an outer surface of the core 112 may beneficially position a larger amount of conductive elements 118 at a location where a larger amount of electrical energy flows. For example, the conductor 100 may be included in an alternating current (AC) circuit and configured to transmit communicate, or carry AC current. AC circuits often experience "skin effect" in which majority of the electrons being communicated through conductors preferably remain proximate to an outer surface of the conductor. Thus, when AC is communicated through each of the core 112 and the conductor layer 120 of the conductor, the majority of the electrons travel proximate to the outer surfaces of each of the conductor layer 120 and the core 112. In such implementations, it is advantageous to make the interface between the core 112 and a conductive layer positioned adjacent thereto, for example, the conductor layer 118, or the encapsulation layer 114 in embodiments in which an encapsulation layer 114 is included and is conductive. Distributing a higher percentage of the conductive elements 118 proximate to an outer surface of the core 112 provides a higher conductivity proximate to the outer surface of the core 112 where the skin effect is dominant. Since conductive elements 118 (e.g., CNT conductive fibers, filaments, or tows) can be expensive, distributing the conductive elements 118 at locations where the most benefit in terms of electrical energy transmission can be achieved reduces cost by distributing fewer conductive elements 118 proximate to the central axis of the core 118 where lesser electrons travel, thus providing higher conductivity at lowest cost.

The plurality of conductive elements 118 form a conductive network within the core 112 causing a substantial increase in the conductivity of the core 112. Thus, in addition to the conductor layer 120 being conductive, and optionally, the encapsulation layer 114 being conductive, the plurality of conductive elements 118 also cause the core to be conductive, thereby providing an additional conductive path for electrical energy through the conductor 100 or otherwise increase the overall conductivity of the conductor 100. In some embodiments, the plurality of conductive elements 118 may additionally serve as reinforcing members for mechanically reinforcing the core 112 and thereby, the conductor 100.

The conductive elements 118 may include at least one of conductive fibers, conductive filaments, or conductive tows. Any suitable conductive fiber, conductive filaments, or conductive tows 118 may be included in the core 112 including, but not limited to, conductive carbon nanotubes (CNTs) or graphene. For example, conductive CNTs that may be included or otherwise disposed in the core 112 in the form of fibers, filaments, and/or tows may include single walled CNTs, double walled CNTs, multiwalled CNTs, graphene coated CNTs, any other suitable CNTs, or any suitable combination thereof. In some embodiments, the conductive elements may include CNT tows having CNT fibers or CNT filaments in a range of about 10 CNT filaments to about 60,000 CNT filaments, inclusive in the tow (e.g., about 10, 20, 30, 40, 50, 100, 150, 200, 250, 300, 350, 400, 450, 500, 600, 700, 800, 900, or 1,000, 5,000, 10,000, 15,000, 20,000, 25,000, 30,000, 35,000, 40,000, 45,000, 50,000, 55,000, or about 60,000 filaments in the tow, inclusive of all ranges and values therebetween). In some embodiments, the CNTs may include GALVORN® 37 filament CNT fiber tow having a linear mass of about 10.7 mg/m, a linear resistance of about 18.0 ohm/meter, a specific conductivity of about 5,300 $Sm^2$/kg, a break force of about 1.8 kg, and a tenacity of about 1,600 mN/tex. In some embodiments, the CNTs may include GALVORN® 199 filament CNT fiber tow having a linear mass of about 110 mg/m, a linear resistance of about 2.0 ohm/meter, a specific conductivity of about 4,500 $Sm^2$/kg, a break force of about 10.0 kg, and a tenacity of about 900 mN/tex. In some embodiments, the conductive elements 118 may include conductive fibers, conductive filaments, or conductive tows formed from conductive polymers including, but not limited to, polyaniline (PANI), polypyrrole (PPy). polythiophene (PT), polyacetylene (PA), polyfluorene (PF), poly(3,4-ethylenedioxythiophene) (PEDOT), poly(3-hexylthiophene) (P3HT), polyphenylene vinylene (PPV), poly(3-methylthiophene) (PMT), polyindole (PIn), any other suitable conductive polymer or any suitable combination thereof.

In some embodiments, a quantity of the plurality of conductive elements 118 in the composite core 112 may be 100% (i.e., all the conductive elements used are highly conductive, for example, better than the conventional carbon fibers such as T700 fibers). The quantity of the plurality of conductive elements could also be any ratio of mixture with the conventional nonconductive or less conductive reinforcement fibers, such as equal to or less than 50% by weight. In some embodiments, a quantity of the plurality of conductive elements 118 in the composite core 112 may be equal to or less than 10% by weight. In some embodiments, a quantity of the plurality of conductive elements 118 in the composite core 112 may be equal to or less than 1% by weight. In some embodiments, a quantity of the plurality of conductive elements 118 in the composite core 112 may be equal to or less than 0.8% by weight. In some embodiments, a quantity of the plurality of conductive elements 118 in the composite core 112 may be equal to or less than 0.6% by weight. In some embodiments, a quantity of the plurality of conductive elements 118 in the composite core 112 may be equal to or less than 0.5% by weight. In some embodiments, a quantity of the plurality of conductive elements 118 in the composite core 112 may be equal to or less than 0.4% by weight. In some embodiments, a quantity of the plurality of conductive elements 118 in the composite core 112 may be equal to or less than 0.3% by weight.

In some embodiments, a quantity of the plurality of conductive elements 118 in the composite core 112 is at most about 5.0% by weight. In some embodiments, a quantity of the plurality of conductive elements 118 in the composite core 112 is at most about 4.5% by weight. In some embodiments, a quantity of the plurality of conductive elements 118 in the composite core 112 is at most about 4.0% by weight. In some embodiments, a quantity of the plurality of conductive elements 118 in the composite core 112 is at most about 3.5% by weight. In some embodiments, a quantity of the plurality of conductive elements in the composite core 112 is at most about 3.0% by weight. In some embodiments, a quantity of the plurality of conductive elements 118 in the composite core 112 is at most about 2.5% by weight. In some embodiments, a quantity of the plurality of conductive elements 118 in the composite core 112 is at most about 2.0% by weight. In some embodiments, a quantity of the plurality of conductive elements 118 in the composite core 112 is at most about 1.5% by weight. In some embodiments, a quantity of the plurality of conductive elements 118 in the composite core 112 is at most about 1.0% by weight. In some embodiments, a quantity of the plurality of conductive elements 118 in the composite core 112 is at most about 0.5% by weight. In some embodiments, a quantity of the plurality of conductive elements 118 in the core 112 may be in a range of about 0.1% to about 1% by weight, inclusive (e.g., about 0.1%, 0.2%, 0.3, 0.4%, 0.5%, 0.6%, 0.7%, 0.8%, 0.9%, or about 1.0% by weight, inclusive).

In some embodiments, the conductive elements 118 includes conductive filaments or conductive tows having a length in a range of about 10 microns to about 50 microns, inclusive (e.g., about 10, 15, 20, 25, 30, 35, 40, 45, or 50 microns, inclusive). In some embodiments, the conductive elements 118 includes conductive filaments or conductive tows having a length of at least about 5 microns. In some embodiments, the conductive elements 118 includes conductive filaments or conductive tows having a length of at least about 10 microns. In some embodiments, the conductive elements 118 includes conductive filaments or conductive tows having a length of at least about 15 microns. In some embodiments, the conductive elements 118 includes conductive filaments or conductive tows having a length of at least about 20 microns. In some embodiments, the conductive elements 118 includes conductive filaments or conductive tows having a length of at least about 25 microns. In some embodiments, the conductive elements 118 includes conductive filaments or conductive tows having a length of at least about 30 microns. In some embodiments, the conductive elements 118 includes conductive filaments or conductive tows having a length of at least about 35 microns. In some embodiments, the conductive elements 118 includes conductive filaments or conductive tows having a length of at least about 40 microns. In some embodiments, the conductive elements 118 includes conductive filaments or conductive tows having a length of at least about 45 microns.

In some embodiments, the conductive elements 118 includes conductive filaments or conductive tows having a length of at most about 50 microns. In some embodiments, the conductive elements 118 includes conductive filaments or conductive tows having a length of at most about 45 microns. In some embodiments, the conductive elements 118 includes conductive filaments or conductive tows having a length of at most about 40 microns. In some embodiments, the conductive elements 118 includes conductive filaments or conductive tows having a length of at most about 35 microns. In some embodiments, the conductive elements 118 includes conductive filaments or conductive tows having a length of at most about 30 microns.

In some embodiments, a conductivity of the plurality of conductive elements 118 may be in a range of about $10^2$ S/m to about $10^8$ S/m, inclusive (e.g., about $10^2$, $10^3$, $10^4$, $10^5$, $10^6$, $10^7$, or about $10^8$ S/m, inclusive of all ranges and values therebetween). In some embodiments, a conductivity of the plurality of conductive elements 118 may be at least about $10^2$ S/m. In some embodiments, a conductivity of the plurality of conductive elements 118 may be at least about $10^3$ S/m. In some embodiments, a conductivity of the plurality of conductive elements 118 may be at least about $10^4$ S/m. In some embodiments, a conductivity of the plurality of conductive elements 118 may be at least about $10^5$ S/m. In some embodiments, a conductivity of the plurality of conductive elements 118 may be at least about $10^6$ S/m.

In some embodiments, a specific conductivity of the plurality of conductive elements 118 may be in a range of about 500 $Sm^2$/kg to about 10,000 $Sm^2$/kg, inclusive (e.g., about 500, 1,000, 1,500, 2,000, 2,500, 3,000, 3,500, 4,000, 4,500, 5,000, 5,500, 6,000, 6,500, 7,000, 7,500 8,000, 8,500 9,000, 9,500, or about 10,000 $Sm^2$/kg, inclusive). In some embodiments, the specific conductivity of the plurality of conductive elements 118 may be at least 500 $Sm^2$/kg. In some embodiments, the specific conductivity of the plurality of conductive elements 118 may be at least 1,000 $Sm^2$/kg. In some embodiments, the specific conductivity of the plurality of conductive elements 118 may be at least 1,500 $Sm^2$/kg. In some embodiments, the specific conductivity of the plurality of conductive elements 118 may be at least 2,000 $Sm^2$/kg. In some embodiments, the specific conductivity of the plurality of conductive elements 118 may be at least 2,500 $Sm^2$/kg. In some embodiments, the specific conductivity of the plurality of conductive elements 118 may be at least 3,000 $Sm^2$/kg. In some embodiments, the specific conductivity of the plurality of conductive elements 118 may be at least 3,500 $Sm^2$/kg. In some embodiments, the specific conductivity of the plurality of conductive elements 118 may be at least 4,000 $Sm^2$/kg. In some embodiments, the specific conductivity of the plurality of conductive elements 118 may be at least 4,500 $Sm^2$/kg. In some embodiments, the specific conductivity of the plurality of conductive elements 118 may be at least 5,000 $Sm^2$/kg. In some embodiments, the specific conductivity of the plurality of conductive elements 118 may be at least 5,500 $Sm^2$/kg. In some embodiments, the specific conductivity of the plurality of conductive elements 118 may be at least 6,000 $Sm^2$/kg. In some embodiments, the specific conductivity of the plurality of conductive elements 118 may be at least 6,500 $Sm^2$/kg. In some embodiments, the specific conductivity of the plurality of conductive elements 118 may be at least 7,000 $Sm^2$/kg. In some embodiments, the specific conductivity of the plurality of conductive elements 118 may be at least 7,500 $Sm^2$/kg. In some embodiments, the specific conductivity of the plurality of conductive elements 118 may be at least 8,000 $Sm^2$/kg. In some embodiments, the specific conductivity of the plurality of conductive elements 118 may be at least 8,500 $Sm^2$/kg. In some embodiments, the specific conductivity of the plurality of conductive elements 118 may be at least 9,000 $Sm^2$/kg. In some embodiments, the specific conductivity of the plurality of conductive elements 118 may be at least 9,500 $Sm^2$/kg. In some embodiments, the specific conductivity of the plurality of conductive elements 118 may be at least 10,000 $Sm^2$/kg.

Inclusion of the conductive elements 118 in the core 112 advantageously cause the core 112 to be conductive such that the core 112 has a resistance that is equal to or less than 50% of a resistance of a comparable core that does not include the plurality of conductive elements 118. In some embodiments, the core 112 has a resistance that is equal to or less than 40% of a resistance of a comparable core that does not include the plurality of conductive elements 118. In some embodiments, the core 112 has a resistance that is equal to or less than 35% of a resistance of a comparable core that does not include the plurality of conductive elements 118. In some embodiments, the core 112 has a resistance that is equal to or less than 30% of a resistance of a comparable core that does not include the plurality of conductive elements 118. In some embodiments, the core 112 has a resistance that is equal to or less than 25% of a resistance of a comparable core that does not include the plurality of conductive elements 118. In some embodiments, the core 112 has a resistance that is equal to or less than 20% of a resistance of a comparable core that does not include the plurality of conductive elements 118.

In some embodiments, the core 112 may have a resistance of less than about 2 ohm. In some embodiments, the core 112 has a resistance that is at most 50% of a resistance of a comparable core that does not include the plurality of conductive elements 118 (e.g., a pure carbon core). In some embodiments, the core 112 has a resistance that is at most 45% of a resistance of a comparable core that does not include the plurality of conductive elements 118. In some embodiments, the core 112 has a resistance that is at most 40% of a resistance of a comparable core that does not include the plurality of conductive elements 118. In some embodiments, the core 112 has a resistance that is at most 35% of a resistance of a comparable core that does not include the plurality of conductive elements 118. In some embodiments, the core 112 has a resistance that is at most 30% of a resistance of a comparable core that does not include the plurality of conductive elements 118. In some embodiments, the core 112 has a resistance that is at most 25% of a resistance of a comparable core that does not include the plurality of conductive elements 118. In some embodiments, the core 112 has a resistance that is at most 20% of a resistance of a comparable core that does not include the plurality of conductive elements 118. In some embodiments, the core 112 has a resistance that is in a range of about 20% to about 50%, inclusive (e.g., about 20%, 25%, 30%, 35%, 40%, 45%, or 50%, inclusive) of a resistance of a comparable core that does not include the plurality of conductive elements 118.

In some embodiments, a ratio of a resistivity of the core 112 including the plurality of conductive elements 118 to a resistivity of a core that does not include the plurality of conductive elements 118 is equal to or less than 1:10. In some embodiments, a ratio of a resistivity of the core 112 including the plurality of conductive elements 118 to a resistivity of a core that does not include the plurality of conductive elements 118 is equal to or less than 1:8. In some embodiments, a ratio of a resistivity of the core 112 including the plurality of conductive elements 118 to a resistivity of a core that does not include the plurality of conductive elements 118 is equal to or less than 1:6. In some embodiments, a ratio of a resistivity of the core 112 including the plurality of conductive elements 118 to a resistivity of a core that does not include the plurality of conductive elements 118 is equal to or less than 1:4. In some embodiments, a ratio of a resistivity of the core 112 including the plurality of conductive elements 118 to a resistivity of a core that does not include the plurality of conductive elements 118 is equal to or less than 1:2. In some embodiments, a ratio of a resistivity of the core 112 with the plurality of conductive elements 118 to a resistivity of a core that does not include the plurality of conductive elements 118 is equal to or less than 0.9:2. In some embodiments, a ratio of a resistivity of the core 112 with the plurality of conductive elements 118 to a resistivity of a core that does not include the plurality of conductive elements 118 is equal to or less than 0.8:2. In some embodiments, a ratio of a resistivity of the core 112 with the plurality of conductive elements 118 to a resistivity of a core that does not include the plurality of conductive elements 118 is equal to or less than 0.7:2. In some embodiments, a ratio of a resistivity of the core 112 with the plurality of conductive elements 118 to a resistivity of a core that does not include the plurality of conductive elements 118 is equal to or less than 0.6:2. In some embodiments, a ratio of a resistivity of the core 112 with the plurality of conductive elements 118 to a resistivity of a core that does not include the plurality of conductive elements 118 is equal to or less than 0.5:2. In some embodiments, a ratio of a resistivity of the core 112 with the plurality of conductive elements 118 to a resistivity of a core that does not include the plurality of conductive elements 118 is equal to or less than 0.4:2. In some embodiments, a ratio of a resistivity of the core 112 with the plurality of conductive elements 118 to a resistivity of a core that does not include the plurality of conductive elements 118 is equal to or less than 0.3:2. In some embodiments, a ratio of a resistivity of the core 112 with the plurality of conductive elements 118 to a resistivity of a core that does not include the plurality of conductive elements 118 is equal to or less than 0.2:2. In some embodiments, a ratio of a resistivity of the core 112 with the plurality of conductive elements 118 to a resistivity of a core that does not include the plurality of conductive elements 118 is equal to or less than 0.1:2. In some embodiments, a ratio of a resistivity of the core 112 with the plurality of conductive elements 118 to resistance of a comparable core that does not include the plurality of conductive elements 118 is in a range of about 0.1:2 to about 1:10, inclusive.

In some embodiments, in addition to the conductive elements 118 being included in the core 112, conductive fillers or conductive additives may be included in the composite matrix (e.g., resin matrix) that forms a bulk volume of the core 112. Inclusion of such conductive fillers in the resin matrix itself can beneficially make the composite matrix conductive, thus providing an additional conductive path through the core 112 in addition to the conductive pat provided by the conductive elements 118. The additional path provided by the conductive fillers or additives may provide a separate conductive path through the composite matrix itself, or provide a synergistic conductive path along with the conductive elements 118 that extend through the composite matrix forming the core 112. Suitable conductive fillers or conductive additives that may be included in the composite matrix to be part of the composite matrix can include, but are not limited to carbon black particles, graphene particles, CNTs, silver nanoparticles, copper nanoparticles, gold particles, aluminum particles, nickel particles, zinc particles, iron oxide particles, indium tin oxide (ITO) particles, any other suitable conductive particles or any suitable combination thereof.

In some embodiments, having the conductive or at least partially conductive core 112 or at least partially electrically conductive core may cause the conductor 110 to have a resistance of equal to or less than about 0.6 ohm/km, which may be lesser than a resistance of a comparable conductor that does not include the electrically conductive core. In some embodiments, the conductive or at least partially conductive core 112 may cause the conductor 110 to have a resistance of equal to or less than about 0.59 ohm/km. In some embodiments, the conductive or at least partially conductive core 112 may cause the conductor 110 to have a resistance of equal to or less than about 0.58 ohm/km. In some embodiments, the conductive or at least partially conductive core 112 may cause the conductor 110 to have a resistance of equal to or less than about 0.57 ohm/km. In some embodiments, the conductive or at least partially conductive core 112 may cause the conductor 110 to have a resistance of equal to or less than about 0.56 ohm/km. In some embodiments, the conductive or at least partially conductive core 112 may cause the conductor 110 to have a resistance of equal to or less than about 0.55 ohm/km.

In some embodiments, the conductive or at least partially conductive core 112 may cause the conductor 110 to have a resistance of equal at most about 0.6 ohm/km. In some embodiments, the conductive or at least partially conductive core 112 may cause the conductor 110 to have a resistance of equal at most about 0.59 ohm/km. In some embodiments, the conductive or at least partially conductive core 112 may cause the conductor 110 to have a resistance of equal at most about 0.58 ohm/km. In some embodiments, the conductive or at least partially conductive core 112 may cause the conductor 110 to have a resistance of equal at most about 0.57 ohm/km. In some embodiments, the conductive or at least partially conductive core 112 may cause the conductor 110 to have a resistance of equal at most about 0.56 ohm/km. In some embodiments, the conductive or at least partially conductive core 112 may cause the conductor 110 to have a resistance of equal at most about 0.55 ohm/km. In some embodiments, the conductive or at least partially conductive core 112 may cause the conductor 110 to have a resistance in a range of about 0.5 ohm/km to about 0.6 ohm/km, inclusive. Various combinations or subcombinations are also envisioned (e.g., in a range of between about 0.59 ohm/km, inclusive or about 0.51 ohm/km, or in range between about 0.58 ohm/km and about 0.54 ohm/km, inclusive) and should be considered to be within the scope of this disclosure.

The core 112 may have any suitable cross-sectional width (e.g., diameter). In some embodiments, the core 112 has a diameter in a range of about 2 mm to about 15 mm, inclusive (e.g., 2, 3, 4, 5, 6, 7, 8, 9, 10, 11, 12, 13, 14, or 15 mm, inclusive). In some embodiments, the core 112 may have a diameter in a range of about 3.5 mm to about 10 mm, inclusive. In some embodiments, the core 112 may have a diameter in a range of about 10 mm to about 15 mm, inclusive. In some embodiments, the core 112 may have a diameter in a range of about 7 mm to about 12 mm, inclusive. In some embodiments, the core 112 may have a diameter of about 9 mm. In some embodiments, the core 112 may have a diameter in a range of about 2 mm to about 5 mm, inclusive. In some embodiments, the core 112 may have a diameter of about 3.5 mm.

In some embodiments, the core 112 may have a glass transition temperature (e.g., for thermoset composites), or melting point of at least about 70 degrees Celsius (e.g., at least 75, at least 80, at least 90, at least 100, at least 120, at least 140, at least 150, at least 160, at least 180, at least 200, at least 220, at least 240, or at least 250, degrees Celsius, inclusive). The glass transition temperature or melting point of the core 112 may correspond to a threshold operating temperature of the conductor 100, which may limit the ampacity of the conductor 100. In other words, a maximum amount of current that can be delivered through the conductor 100 is the current at which the operating temperature of the conductor 100, or at least the temperature of the core 112 is less than the glass transition temperature or melting point of the composite core 112.

In some embodiments, the core 112 defines a circular cross-section. In some embodiments, the core 112 may define an ovoid, elliptical, polygonal, or asymmetrical cross-section. In some embodiments, the strength member 110 may include a single core 112. In other embodiments, the strength member 110 may include multiple cores, for example, 2, 3, 4, or even more, with the encapsulation layer 114 being disposed around the multiple cores or around each individual core. In such embodiments, each of the multiple cores may be substantially similar to each other, or at least one of the multiple cores may be different from the other cores (e.g., have a different size, different shape, formed from a different material, have components embedded therein, etc.).

In some embodiments, the core 112 is solid, i.e., does not include any holes or voids therein other than a de minimis amount of naturally occurring voids or porosities that may form during a fabrication process of the core 112. In some embodiments, the core 112 may be hollow, for example, define one or more deliberately formed channels or voids therein or therethrough (e.g., extending axially along and/or defined about a longitudinal axis of the strength member 110). Sensing or transmission components may be embedded within the void or channels defined in the core 112. For example, in some embodiments, sensors such as strain gages, accelerometers, or optical fiber sensors may be disposed within, or extend through the core 112. The sensors may be configured to sense various operating parameters of the conductor 100, for example, mechanical strain, sag (i.e., the vertical difference between the points of support of the conductor 100 to a lowest point of the conductor 100), operating temperature, voltage, or current passing through the conductor 100, any other suitable operating parameter or a combination thereof. In some embodiments, the optical fibers extending through the core 112 may include communication optical fibers. In such embodiments, the optical fibers may communicate an optical signal (e.g., transmit sensor data, internet, or media signals, etc.) therethrough.

In some embodiments, the encapsulation layer 114 may be disposed around the core 112, for example, circumferentially around the core 112. In some embodiments, an insulation layer (not shown) may optionally be interposed between the core 112 and the encapsulation layer 114. The insulation layer may be formed from any suitable insulative material, for example, glass fibers (disposed either substantially parallel to axial direction or woven or braided glass), a resin layer, an insulative coating, any other suitable insulative material or a combination thereof. In some embodiments, the insulation layer may also be disposed on axial ends of the core 112, for example, to protect the axial ends of the core 112 from corrosive chemicals, environmental damage, etc.

The encapsulation layer 114 may be formed from any suitable electrically conductive or non-conductive material. In some embodiments, the encapsulation layer 114 may be formed from a conductive material including, but not limited to aluminum (e.g., 1350-H19), annealed aluminum (e.g., 1350-0), aluminum alloys (e.g., Al—Zr alloys, 6000 series Al alloys such as 6201-TSl, -T82, -T83, 7000 series Al alloys, 8000 series Al alloys, etc.), copper, copper alloys (e.g., copper magnesium alloys, copper tin alloys, copper micro-alloys, etc.), any other suitable conductive material, or any combination thereof. In some embodiments, the encapsulation layer 114 is formed from Al and is optionally pretensioned, i.e., is under tensile stress after being disposed on the core 112. In some embodiments, the encapsulation layer 114 may be formed from a non-conductive material, for example, polymers, plastics, rubber, silicone, etc.

The encapsulation layer 114 may be disposed on the core 112 using any suitable process. In some embodiments, the encapsulation layer 114 may be disposed around the core 112 using a conforming machine. For example, the encapsulation process may be performed with a similarly functional machine other than a conforming machine, and be optionally further drawn to achieve target characteristics of the encapsulation layer 114 (e.g., a desired geometry or stress state). The conforming machines or the similar machines used for disposing the encapsulation layer 114 may allow quenching of the encapsulation layer 114. The conforming machine may be integrated with stranding machine, or with pultrusion machines used in making fiber reinforced composite strength members. While FIG. 1 shows a single encapsulation layer 114 disposed around the core 112, in some embodiments, multiple encapsulation layers 114 may be disposed around the core 112. In such embodiments, each of the multiple encapsulation layers 114 may be substantially similar to each other, or may be different from each other (e.g., formed from different materials, have different thicknesses, have different tensile strengths, etc.). In some embodiments, the core 112 may include a carbon fiber reinforced composite, and the encapsulation layer 114 may include aluminum, for example, pretensioned or precompressed aluminum. While a single core 112 is shown in FIG. 1, in some embodiments, the conductor 100 may include a plurality of cores 112, each including the plurality of conductive elements 118, and each having one or more encapsulation layers 114 disposed thereon.

In some embodiments, the interface between the core 112 and the encapsulation layer 114 may optionally include surface features, for example, grooves, slots, notches, indents, detents, etc. to enhance adhesion, bonding and/or interfacial locking between a radially outer surface of the core 112 and a radially inner surface of the encapsulation layer 114. Such surface features may facilitate retention and preservation of the stress from pretensioning in the encapsulation layer 114. In some embodiments, the composite core 112 may have a glass fiber tow disposed around its outer surface to create a screw shape or twisted surface. In some embodiments, a braided or woven fiber layer is applied in the outer layer of the core 112 to promote interlocking or bonding between the core 112 and the encapsulation layer 114.

In some embodiments, the encapsulation layer 114 may have a thickness in a range of about 0.1 mm to about 5 mm, inclusive, or even higher (e.g., 0.1, 0.2, 0.5, 1, 1.5, 2.0, 2.5, 3.0, 3.5, 4.0, 4.5, 5.0 mm, inclusive, or even higher). In some embodiments, a ratio of an outer diameter of the encapsulation layer 114 to an outer diameter of the core 112 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

In some embodiment, the strength member 110 may have a minimum level of tensile strength, for example, at least 600 MPa (e.g., at least 600, at least 700, at least 800, at least 1,000, at least 1,200, at least 1,400, at least 1,600, at least 1,800, or at least 2,000 MPa). In some embodiments, the elongation during pretension of the strength member 110 may include elongation by at least 0.001% strain (e.g., at least 0.001%, at least 0.01%, at least 0.05%, at least 0.1%, at least 0.15%, at least 0.2%, at least 0.25%, at least 0.3%, at least 0.35%, at least 0.4%, at least 0.45%, or at least 0.5% strain, inclusive) depending on the type of strength members and the degree of knee point reduction, and the strength member 110 may be pre-tensioned before or after entering the conforming machine. Moreover, the strength member 110 may be configured to endure radial compression from crimping of conventional fittings as well as radial pressure during conforming of drawing down process or folding and molding of at least 3 kN (e.g., at least 3, at least 4, at least 5, at least 10, at least 15, at least 20, or at least 25 KN, inclusive), for example for composite cores 112 with little to substantially no plastic deformation.

In some embodiments, the encapsulation layer 114 may have an outer surface that is configured to be smooth and shiny (e.g., surface treated) so as to reduce absorptivity (i.e., enhance reflectivity) thus reducing an operating temperature of the core 112. Examples of encapsulation layers 114 having a shiny outer surface that may be included in the conductor 100 are described in detail in U.S. patent application Ser. No. 18/189,726, filed Mar. 24, 2023, and entitled "Composite Conductors Including Radiative and/or Hard Coatings and Methods of Manufacture Thereof," the entire disclosure of which is incorporated herein by reference (hereinafter referred to as "the '726 application").

In some embodiments, the outer surface of the encapsulation layer 114 may be surface treated (e.g., plasma treated, texturized, etc.) to have the absorptivity or reflectivity as described above. In some embodiments, the strength member 110, i.e., the outer surface of the encapsulation layer 114 may be optionally coated with an inner coating (not shown) to reduce solar absorptivity. For example, the inner coating 116 may be disposed between the encapsulation layer 114 and the conductor layer 120. Examples of such inner coatings are described in detail in the '726 application.

The conductor layer 120 is disposed around the strength member 110 and configured to transmit electrical signals therethrough at an operating temperature in a range of 60 degrees to 250 degrees Celsius, inclusive. In some embodiments, the conductor layer 120 may include a plurality of strands of a conductive material disposed around the strength member 110. For example, the conductor layer 120 may include a first set of conductive strands disposed around the strength member 110 in a first wound direction (e.g., wound helically around the strength member 110 in a first rotational direction), a second set of conductive strands disposed around the first set of strands in a second wound direction (e.g., wound helically around the first set of conductive strands in a second rotational direction opposite the first rotational direction), and may also include a third set of strands wound around the second set of strands in the first wound direction, and may further include any number of additional strands as desired.

In some embodiments, the conductor layer 120 (e.g., a plurality of strands of conductive material) may include, for example, aluminum, aluminum alloy, copper or copper alloy including micro alloy as conductive media, etc. In some embodiments, the conductor layer 120 may include conductive strands including Z, C or S wires to keep the outer strands in place. The conductor layer 120 may have any suitable cross-sectional shape, for example, circular, triangular, trapezoidal, etc. In some embodiments, the conductor layer 120 may include a stranded aluminum layer that may be round or trapezoidal. In some embodiments, the conductor layer 120 may include Z shaped aluminum strands. In some embodiments, the conductor layer 120 may include S shaped aluminum strands.

In some embodiments, the strength member 110 may be optionally tensioned while the conductor layer 120 of aluminum or copper or their respective alloys disposed around the strength member 110 may be applied to cause the conductor 100 to form a cohesive conductive hybrid rod that is spoolable onto a conductor reel. In some embodiments, to facilitate conductor spooling onto a reel and conductor spring back at ease, the conductor 100 may be optionally configured to be non-round (e.g., elliptical) such that the shorter axis (in conductor 100) is subjected to bending around a spool (or a sheaves wheel during conductor installation) to facilitate a smaller bend or spool radius, while the strength members 110 may be configured to have a longer axis to facilitate spring back for installation. The overall conductor 100 may be round with non-round strength member 110 or multiple strength members 110 arranged to be non-round, and the spooling bending direction may be along the long axis of the strength member 110 to facilitate spring back while not overly subjecting the conductor layer 120 with additional compressive force from spooling bending.

To further facilitate spooling of the conductor layer 120 on the strength member 110, in some embodiments, the conductor layer 120 may include multiple segments, for example, strands or sets of strands or wires of conductive material (e.g., 2, 3, 4, etc.), and each segment bonded to strength member 110 while retaining compressive stress, and the segments rotates one full rotation or more along the conductor 100 length (equal to one full spool in a reel) to facilitate easy spooling. Thus, the conductor 100 may be configured to have negligible skin effect (i.e., conducting layer thickness is less than the skin depth required at AC circuit frequency), with the strength member 110 being under sufficient residual tensile stress, and the conductor layer 120 (e.g., each of the strands of the conductive material) being mostly free of tension or under compressive stress. In some embodiments, the strands of the conductive material may be formed from a conforming machine, for example, by extruding hot deformable (e.g., semi solid) conductive material (e.g., aluminum) from a mold. The strands can be molded to be round, trapezoidal, or any other desirable shape. In some embodiments, the extrusion mold or die may have a stranding lay ratio defined therein so that during the stranding operation of the conductive strands, no shaping may be needed (e.g., removing of sharp corners or edges of the conductive strands to avoid corona as is performed in conventional stranding operations). In some embodiments, the conductive media may be extruded out of the mold or die at an angle so as to form conductive strands that wrap around the strength member 110 at an angle, as described herein.

In some embodiments, for AC applications where skin effect is prominent, the conductor layer 120 may include a plurality of layers of conductive strands disposed concentrically around the strength member 110, with each layer being of finite thickness to maximize skin effect for lowest AC resistance at minimal conductor content. In some embodiments, the conductor layer 120 may be optionally stranded to facilitate conductor spooling around a reasonably sized spool and facilitate conductor stringing. In some embodiments, the outer most strands included in the conductor layer 120 may be TW, C, Z, S, or round strands if more aluminum or copper are used, as it will not cause permanent bird caging problem (i.e., the inner strands of the conductor layer 120 may not be deformed such that they prevent the outer strands from proper resettlement after tension is released or reduced). Accordingly, the smooth outer surface and the compact configuration can effectively reduce the wind load and ice accumulation on the conductor 100, resulting in less sag from ice or wind related weather events.

It should be appreciated that, the conductor layer 120 may be under no substantial tension while the strength member 110 may be pre-stretched/tensioned. After the pre-tension in the strength member 110 is released, the conductor layer 120 may be subjected to compression, which may minimize the shrinking back of the strength member 110. The strength member 110 made with composite materials may have a strength above 80 ksi, and a modulus ranging from 5 msi to 40 msi, and a CTE of about $1\times10^{-6}$/° C. to about $8\times10^{-6}$/° C., inclusive.

In some embodiments, an insulating layer 122 (e.g., a jacket) may optionally be disposed around the conductor layer 120. The insulating layer 122 may be formed from any suitable electrically insulative material, for example, rubber, plastics, or polymers (e.g., polyethylene, PTFE, high density polyethylene, cross-linked high density polyethylene, etc.). The insulating layer 122 may be configured to electrically isolate or shield the conductor 100. In some embodiments, the insulating layer 122 may be excluded.

In some embodiments, an outer surface of the conductor layer 120 (e.g., outer surface of the outermost conductive strands or an outer surface of each of the conductive strands) or the insulating layer is treated with features and/or include features to cause the outer surface to have a solar absorptivity of less than 0.6 (e.g., less than 0.55, less than 0.5, less than 0.45, less than 0.4, less than 0.35, less than 0.3, less than 0.25, less than 0.2, less than 0.15, or less than 0.1, inclusive). In some embodiments, the outer surface has a solar absorptivity of less than 0.55. In some embodiments, the outer surface of the conductor layer 120 may be treated or otherwise configured to have a reflectivity of less than 50% corresponding to an operating temperature of greater than 90 degrees Celsius.

The outer surface of the conductor layer 120 may be configured to have low reflectivity using any suitable treatment or process. In some embodiments, an outer coating may be disposed on the outer surface of the conductor layer 120 in addition to, or alternatively to the outer surface being treated of the conductor layer, as described herein. The outer coating may be formulated to have a solar absorptivity of less than 0.6 (e.g., less than 0.6, less than 0.55, less than 0.5, 1 less than 0.45, less than 0.40, less than 0.35, less than 0.30, less than 0.25, less than 0.20, less than 0.15, less than 0.1, inclusive or even lower) at a wavelength of less than 2.5 microns, and a radiative emissivity of greater than 0.5 (e.g., greater than 0.50, greater than 0.55, greater than 0.60, greater than 0.65, greater than 0.70, greater than 0.75, greater than 0.80, greater than 0.85, greater than 0.90, greater than 0.95, inclusive, or even higher) at a wavelength in a range of 2.5 microns to 15 microns, inclusive at an operating temperature in a range of 60 degrees Celsius to 250 degrees Celsius, inclusive. In some embodiments, the outer coating may have an erosion resistance that is at least 5% greater than an erosion resistance of aluminum or aluminum alloys. In some embodiments, the outer coating has a Vickers hardness of greater than 175 MPa. Various examples of conductor layers, surface features and surface treatment methods of the outer surface of the conductor layer, and of outer coatings that may be disposed on an outer surface of the conductor layer, which may be used as the conductor 120, or that may be included in the conductor 120 are described in detail in the '726 application.

By incorporating the plurality of conductive elements 118 in the composite core 112 of the conductor 100, the core 118 is also made conductive in addition to the conductor layer 120 and in some embodiments, the encapsulation layer 114. This provides an additional conductive path for electrical current to be transmitted to the conductor 100 relative to comparable conductors that have cores that do not include the plurality of conductive elements 118, that are non-conductive or insulative, or that have a resistance that is at least 1.5 times of the resistance of the material used to form the conductor layer 120 (e.g., 1.5× the resistance of aluminum or an aluminum alloy) causing the conductor 100 to have several advantages over such comparable conductors. For example, the conductor 100 having the strength member 110 with the conductive core 112 has greater conductivity, greater ampacity, and lesser line loss relative to comparable conductors that do not include a conductive core, without the weight increase and increased sag.

In some instances, the conductor 100 may generate a line loss saving of about $1.79/m ($0.55/ft per year) annually. For a 10,000 km circuit, replacing conventional ACSR conductor with the conductor 100 as described herein can provide a saving of greater $1.6 billion in 30 years. With reduced line loss in the system, the conductor 100 can reduce compensatory generation, and also reduce associated greenhouse gas emission by greater than 26 Million Megaton over 30 years.

Figure 2:
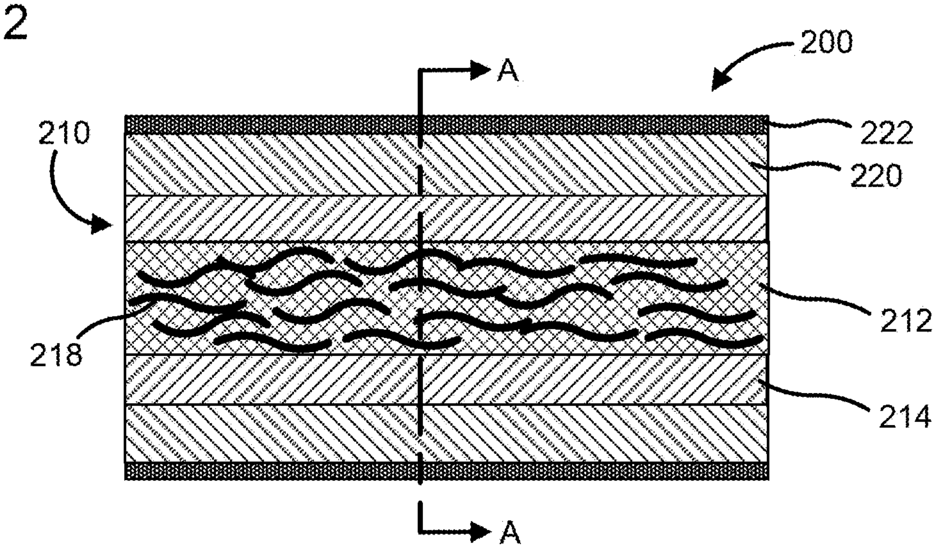
FIG. 2 is a side cross-section view of a conductor including a composite core that includes a plurality of conductive elements that cause the composite core to be conductive, according to an embodiment.
Figure 3:
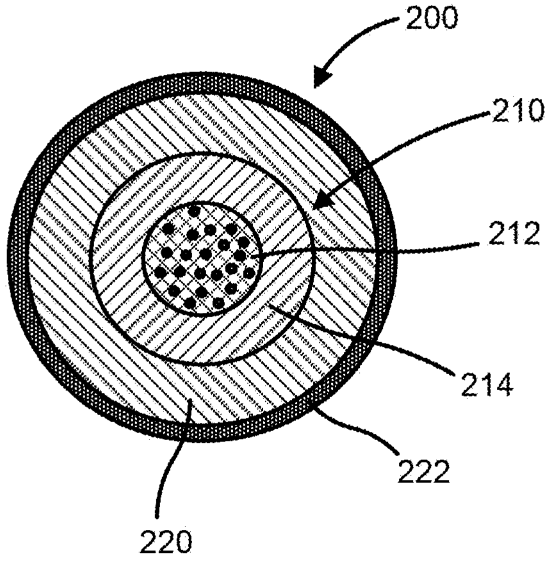
FIG. 3 is a front cross-section view of the conductor of FIG. 2 taken along the line A-A in FIG. 2.

FIG. 2 is a side cross-section view of a conductor 200, according to an embodiment, and FIG. 3 is a front cross-section view taken along the A-A in FIG. 2. The conductor 200 includes a strength member 210, a conductor layer 220 disposed around the strength member 210, and optionally, an insulating layer or jacket 222 disposed on the conductor layer 220.

The strength member 210 includes a core 212, for example, a composite core, and optionally, an encapsulation layer 214 disposed around the core 212, for example, disposed circumferentially around the core 212. The core 212 may be formed from any material, for example, a composite material as described with respect to the core 112 and therefore, not described in further detail herein.

A plurality of conductive elements 218 are disposed in the core 212, for example, longitudinal conductive elements that extend along a longitudinal axis. Such conductive elements 118 may include, but are not limited to conductive fibers, conductive filaments, and/or conductive tows. For example, the plurality of conductive elements 218 may be embedded in the core 212, distributed uniformly (e.g., evenly distributed throughout a cross-section of the core 212), distributed randomly (e.g., distributed in the core 212 in no particular order) within the core 212, distributed asymmetrically through the core 212, mixed in with the composite material used to form the core 212, or are otherwise included in the core 212. For example, in some embodiments, the plurality of conductive elements 218 may be distributed in the core 212 such that a higher concentration of the conductive elements 218 is present proximate to an outer surface of the core 212 relative to a concentration of the conductive elements proximate to a central axis of the core 212. In some embodiments, greater than 50% of a total amount of the plurality of conductive elements 218 may be located within less than 20% of a radial distance from the outer surface of the core 212 to a center portion of the core 212, for example, as described in detail with respect to the conductive elements 118 included in the core 112.

The conductive elements 218 may include at least one of conductive fibers, conductive filaments, or conductive tows. Any suitable conductive fibers, conductive filaments, or conductive tows may be included in the core 212 including, but not limited to, conductive carbon nanotubes (CNTs) or graphene. For example, conductive CNTs that may be included or otherwise disposed in the core 112 may include single walled CNTs, double walled CNTs, multiwalled CNTs, graphene coated CNTs, any other suitable CNTs, any suitable combination thereof, or any other CNTs having any suitable electrical or structural properties as described in detail with respect to the conductive elements 118 of the conductor 100. In some embodiments, the conductive elements 218 may include CNT tows having CNT fibers or CNT filaments in a range of about 10 CNT filaments to about 60,000 CNT filaments, inclusive in the tow (e.g., about 10, 20, 30, 40, 50, 100, 150, 200, 250, 300, 350, 400, 450, 500, 600, 700, 800, 900, or 1,000, 5,000, 10,000, 15,000, 20,000, 25,000, 30,000, 35,000, 40,000, 45,000, 50,000, 55,000, or about 60,000 filaments in the tow, inclusive of all ranges and values therebetween). In some embodiments, the conductive elements 118 may include conductive fibers, conductive filaments, or conductive tows formed from conductive polymers including, but not limited to, polyaniline (PANI), polypyrrole (PPy). polythiophene (PT), polyacetylene (PA), polyfluorene (PF), poly(3,4-ethylenedioxythiophene) (PEDOT), poly(3-hexylthiophene) (P3HT), polyphenylene vinylene (PPV), poly(3-methylthiophene) (PMT), polyindole (PIn), any other suitable conductive polymer or any suitable combination thereof.

In some embodiments, a quantity of the plurality of conductive elements 218 in the composite core 212 may be 100% by weight. The quantity of the plurality of conductive elements 218 could also be any ratio of mixture with the conventional nonconductive or less conductive reinforcement fibers, such as equal to or less than 50% by weight. In some embodiments, a quantity of the plurality of conductive elements 218 in the composite core 212 may be equal to or less than 10% by weight. In some embodiments, a quantity of the plurality of conductive elements 218 in the composite core 212 may be equal to or less than 1% by weight. In some embodiments, a quantity of the plurality of conductive elements 218 in the composite core 212 may be equal to or less than 0.8% by weight. In some embodiments, a quantity of the plurality of conductive elements 218 in the composite core 212 may be equal to or less than 0.6% by weight. In some embodiments, a quantity of the plurality of conductive elements 218 in the composite core 212 may be equal to or less than 0.5% by weight. In some embodiments, a quantity of the plurality of conductive elements 218 in the composite core 212 may be equal to or less than 0.4% by weight. In some embodiments, a quantity of the plurality of conductive elements 218 in the composite core 212 may be equal to or less than 0.3% by weight.

In some embodiments, a quantity of the plurality of conductive elements 218 in the composite core 212 is at most about 5.0% by weight. In some embodiments, a quantity of the plurality of conductive elements 218 in the composite core 212 is at most about 4.5% by weight. In some embodiments, a quantity of the plurality of conductive elements 218 in the composite core 212 is at most about 4.0% by weight. In some embodiments, a quantity of the plurality of conductive elements 218 in the composite core 212 is at most about 3.5% by weight. In some embodiments, a quantity of the plurality of conductive elements 218 in the composite core 212 is at most about 3.0% by weight. In some embodiments, a quantity of the plurality of conductive elements 218 in the composite core 212 is at most about 2.5% by weight. In some embodiments, a quantity of the plurality of conductive elements 218 in the composite core 212 is at most about 2.0% by weight. In some embodiments, a quantity of the plurality of conductive elements 218 in the composite core 212 is at most about 1.5% by weight. In some embodiments, a quantity of the plurality of conductive elements 218 in the composite core 212 is at most about 1.0% by weight. In some embodiments, a quantity of the plurality of conductive elements 218 in the composite core 212 is at most about 0.5% by weight. In some embodiments, a quantity of the plurality of conductive elements 218 in the core 212 may be in a range of about 0.1% to about 1% by weight, inclusive (e.g., about 0.1%, 0.2%, 0.3, 0.4%, 0.5%, 0.6%, 0.7%, 0.8%, 0.9%, or about 1.0% by weight, inclusive).

In some embodiments, the conductive elements 218 includes conductive filaments or conductive tows having a length in a range of about 10 microns to about 50 microns, inclusive (e.g., about 10, 15, 20, 25, 30, 35, 40, 45, or 50 microns, inclusive). In some embodiments, the conductive elements 218 includes conductive filaments or conductive tows having a length of at least about 5 microns. In some embodiments, the conductive elements 218 includes conductive filaments or conductive tows having a length of at least about 10 microns. In some embodiments, the conductive elements 218 includes conductive filaments or conductive tows having a length of at least about 15 microns. In some embodiments, the conductive elements 218 includes conductive filaments or conductive tows having a length of at least about 20 microns. In some embodiments, the conductive elements 218 includes conductive filaments or conductive tows having a length of at least about 25 microns. In some embodiments, the conductive elements 218 includes conductive filaments or conductive tows having a length of at least about 30 microns. In some embodiments, the conductive elements 218 includes conductive filaments or conductive tows having a length of at least about 35 microns. In some embodiments, the conductive elements 218 includes conductive filaments or conductive tows having a length of at least about 40 microns. In some embodiments, the conductive elements 218 includes conductive filaments or conductive tows having a length of at least about 45 microns. In some embodiments, the conductive elements 218 includes conductive filaments or conductive tows having a length of at most about 50 microns. In some embodiments, the conductive elements 218 includes conductive filaments or conductive tows having a length of at most about 45 microns. In some embodiments, the conductive elements 218 includes conductive filaments or conductive tows having a length of at most about 40 microns. In some embodiments, the conductive elements 218 includes conductive filaments or conductive tows having a length of at most about 35 microns. In some embodiments, the conductive elements 218 includes conductive filaments or conductive tows having a length of at most about 30 microns.

In some embodiments, in addition to the conductive elements 218 being included in the core 212, conductive fillers or conductive additives may be included in the composite matrix (e.g., resin matrix) that forms a bulk volume of the core 212. Suitable conductive fillers or conductive additives that may be included in the composite matrix so as to be a part of the composite matrix can include, but are not limited to carbon black particles, graphene particles, CNTs, silver nanoparticles, copper nanoparticles, gold particles, aluminum particles, nickel particles, zinc particles, iron oxide particles, indium tin oxide (ITO) particles, any other suitable conductive particles or any suitable combination thereof.

In some embodiments, a conductivity of the plurality of conductive elements 218 may be in a range of about $10_2$ S/m to about $10^8$ S/m, inclusive (e.g., about $10_2$, $10_3$, $10_4$, $10_5$, $10_6$, $10_7$, or about $10^8$ S/m, inclusive of all ranges and values therebetween). In some embodiments, a conductivity of the plurality of conductive elements 218 may be at least about $10^2$ S/m. In some embodiments, a conductivity of the plurality of conductive elements 218 may be at least about $10^3$ S/m. In some embodiments, a conductivity of the plurality of conductive elements 218 may be at least about $10^4$ S/m. In some embodiments, a conductivity of the plurality of conductive elements 218 may be at least about $10^5$ S/m. In some embodiments, a conductivity of the plurality of conductive elements 218 may be at least about $10^6$ S/m.

In some embodiments, a specific conductivity of the plurality of conductive elements 218 may be in a range of about 500 $Sm^2/kg$ to about 10,000 $Sm^2/kg$, inclusive (e.g., about 500, 1,000, 1,500, 2,000, 2,500, 3,000, 3,500, 4,000, 4,500, 5,000, 5,500, 6,000, 6,500, 7,000, 7,500 8,000, 8,500 9,000, 9,500, or about 10,000 $Sm^2/kg$, inclusive). In some embodiments, the specific conductivity of the plurality of conductive elements 218 may be at least 500 $Sm^2/kg$. In some embodiments, the specific conductivity of the plurality of conductive elements 218 may be at least 1,000 $Sm^2/kg$. In some embodiments, the specific conductivity of the plurality of conductive elements 218 may be at least 1,500 $Sm^2/kg$. In some embodiments, the specific conductivity of the plurality of conductive elements 218 may be at least 2,000 $Sm^2/kg$. In some embodiments, the specific conductivity of the plurality of conductive elements 218 may be at least 2,500 $Sm^2/kg$. In some embodiments, the specific conductivity of the plurality of conductive elements 218 may be at least 3,000 $Sm^2/kg$. In some embodiments, the specific conductivity of the plurality of conductive elements 118 may be at least 3,500 $Sm^2/kg$. In some embodiments, the specific conductivity of the plurality of conductive elements 218 may be at least 4,000 $Sm^2/kg$. In some embodiments, the specific conductivity of the plurality of conductive elements 218 may be at least 4,500 $Sm^2/kg$. In some embodiments, the specific conductivity of the plurality of conductive elements 218 may be at least 5,000 $Sm^2/kg$. In some embodiments, the specific conductivity of the plurality of conductive elements 218 may be at least 5,500 $Sm^2/kg$. In some embodiments, the specific conductivity of the plurality of conductive elements 218 may be at least 6,000 $Sm^2/kg$. In some embodiments, the specific conductivity of the plurality of conductive elements 218 may be at least 6,500 $Sm^2/kg$. In some embodiments, the specific conductivity of the plurality of conductive elements 218 may be at least 7,000 $Sm^2/kg$. In some embodiments, the specific conductivity of the plurality of conductive elements 218 may be at least 7,500 $Sm^2/kg$. In some embodiments, the specific conductivity of the plurality of conductive elements 218 may be at least 8,000 $Sm^2/kg$. In some embodiments, the specific conductivity of the plurality of conductive elements 218 may be at least 8,500 $Sm^2/kg$. In some embodiments, the specific conductivity of the plurality of conductive elements 218 may be at least 9,000 $Sm^2/kg$. In some embodiments, the specific conductivity of the plurality of conductive elements 218 may be at least 9,500 $Sm^2/kg$. In some embodiments, the specific conductivity of the plurality of conductive elements 218 may be at least 10,000 $Sm^2/kg$.

Inclusion of the conductive elements 218 in the core 212 advantageously causes the core 212 to be conductive such that the core 212 has a resistance that is equal to or less than 50% of a resistance of a comparable core that does not include the plurality of conductive elements 218. In some embodiments, the core 212 has a resistance that is equal to or less than 40% of a resistance of a comparable core that does not include the plurality of conductive elements 218. In some embodiments, the core 212 has a resistance that is equal to or less than 35% of a resistance of a comparable core that does not include the plurality of conductive elements 218. In some embodiments, the core 212 has a resistance that is equal to or less than 30% of a resistance of a comparable core that does not include the plurality of conductive elements 218. In some embodiments, the core 212 has a resistance that is equal to or less than 25% of a resistance of a comparable core that does not include the plurality of conductive elements 218. In some embodiments, the core 212 has a resistance that is equal to or less than 20% of a resistance of a comparable core that does not include the plurality of conductive elements 218.

In some embodiments, the core 212 may have a resistance of less than about 2 ohm. In some embodiments, the core

212 has a resistance that is at most 50% of a resistance of a comparable core that does not include the plurality of conductive elements 218 (e.g., a pure carbon core). In some embodiments, the core 212 has a resistance that is at most 45% of a resistance of a comparable core that does not include the plurality of conductive elements 218. In some embodiments, the core 212 has a resistance that is at most 40% of a resistance of a comparable core that does not include the plurality of conductive elements 218. In some embodiments, the core 212 has a resistance that is at most 35% of a resistance of a comparable core that does not include the plurality of conductive elements 218. In some embodiments, the core 212 has a resistance that is at most 30% of a resistance of a comparable core that does not include the plurality of conductive elements 218. In some embodiments, the core 212 has a resistance that is at most 25% of a resistance of a comparable core that does not include the plurality of conductive elements 218. In some embodiments, the core 212 has a resistance that is at most 20% of a resistance of a comparable core that does not include the plurality of conductive elements 218. In some embodiments, the core 212 has a resistance that is in a range of about 20% to about 50%, inclusive (e.g., about 20%, 25%, 30%, 35%, 40%, 45%, or 50%, inclusive) of a resistance of a comparable core that does not include the plurality of conductive elements 218.

In some embodiments, a ratio of a resistivity of the core 212 including the plurality of conductive elements 218 to a resistivity of a core that does not include the plurality of conductive elements 218 is equal to or less than 1:10. In some embodiments, a ratio of a resistivity of the core 212 including the plurality of conductive elements 218 to a resistivity of a core that does not include the plurality of conductive elements 218 is equal to or less than 1:8. In some embodiments, a ratio of a resistivity of the core 212 including the plurality of conductive elements 218 to a resistivity of a core that does not include the plurality of conductive elements 218 is equal to or less than 1:6. In some embodiments, a ratio of a resistivity of the core 212 including the plurality of conductive elements 218 to a resistivity of a core that does not include the plurality of conductive elements 218 is equal to or less than 1:4. In some embodiments, a ratio of a resistivity of the core 212 with the plurality of conductive elements 218 to a resistivity of a core that does not include the plurality of conductive elements 218 is equal to or less than 1:2. In some embodiments, a ratio of a resistivity of the core 212 with the plurality of conductive elements 218 to a resistivity of a core that does not include the plurality of conductive elements 218 is equal to or less than 0.9:2. In some embodiments, a ratio of a resistivity of the core 212 with the plurality of conductive elements 218 to a resistivity of a core that does not include the plurality of conductive elements 218 is equal to or less than 0.8:2. In some embodiments, a ratio of a resistivity of the core 212 with the plurality of conductive elements 218 to a resistivity of a core that does not include the plurality of conductive elements 218 is equal to or less than 0.7:2. In some embodiments, a ratio of a resistivity of the core 212 with the plurality of conductive elements 218 to a resistivity of a core that does not include the plurality of conductive elements 218 is equal to or less than 0.6:2. In some embodiments, a ratio of a resistivity of the core 212 with the plurality of conductive elements 218 to a resistivity of a core that does not include the plurality of conductive elements 218 is equal to or less than 0.5:2. In some embodiments, a ratio of a resistivity of the core 212 with the plurality of conductive elements 218 to a resistivity of a core that does not include the plurality of conductive elements 218 is equal to or less than 0.4:2. In some embodiments, a ratio of a resistivity of the core 212 with the plurality of conductive elements 218 to a resistivity of a core that does not include the plurality of conductive elements 218 is equal to or less than 0.3:2. In some embodiments, a ratio of a resistivity of the core 212 with the plurality of conductive elements 218 to a resistivity of a core that does not include the plurality of conductive elements 218 is equal to or less than 0.2:2. In some embodiments, a ratio of a resistivity of the core 212 with the plurality of conductive elements 218 to a resistivity of a core that does not include the plurality of conductive elements 218 is equal to or less than 0.1:2. In some embodiments, a ratio of a resistivity of the core 212 with the plurality of conductive elements 218 to resistance of a comparable core that does not include the plurality of conductive elements 218 is in a range of about 0.1:2 to about 1:10, inclusive.

In some embodiments, having the conductive or at least partially conductive core 212 or at least partially electrically conductive core may cause the conductor 210 to have a resistance of equal to or less than about 0.6 ohm/km, which may be lesser than a resistance of a comparable conductor that does not include the electrically conductive core. In some embodiments, the conductive or at least partially conductive core 212 may cause the conductor 210 to have a resistance of equal to or less than about 0.59 ohm/km. In some embodiments, the conductive or at least partially conductive core 212 may cause the conductor 210 to have a resistance of equal to or less than about 0.58 ohm/km. In some embodiments, the conductive or at least partially conductive core 212 may cause the conductor 210 to have a resistance of equal to or less than about 0.57 ohm/km. In some embodiments, the conductive or at least partially conductive core 212 may cause the conductor 210 to have a resistance of equal to or less than about 0.56 ohm/km. In some embodiments, the conductive or at least partially conductive core 212 may cause the conductor 210 to have a resistance of equal to or less than about 0.55 ohm/km.

In some embodiments, the conductive or at least partially conductive core 212 may cause the conductor 210 to have a resistance of equal at most about 0.6 ohm/km. In some embodiments, the conductive or at least partially conductive core 212 may cause the conductor 210 to have a resistance of equal at most about 0.59 ohm/km. In some embodiments, the conductive or at least partially conductive core 212 may cause the conductor 210 to have a resistance of equal at most about 0.58 ohm/km. In some embodiments, the conductive or at least partially conductive core 212 may cause the conductor 210 to have a resistance of equal at most about 0.57 ohm/km. In some embodiments, the conductive or at least partially conductive core 212 may cause the conductor 210 to have a resistance of equal at most about 0.56 ohm/km. In some embodiments, the conductive or at least partially conductive core 212 may cause the conductor 210 to have a resistance of equal at most about 0.55 ohm/km. In some embodiments, the conductive or at least partially conductive core 212 may cause the conductor 210 to have a resistance in a range of about 0.5 ohm/km to about 0.6 ohm/km, inclusive. Various combinations or subcombinations are also envisioned (e.g., in a range of between about 0.59 ohm/km, inclusive or about 0.51 ohm/km, or in range between about 0.58 ohm/km and about 0.54 ohm/km, inclusive) and should be considered to be within the scope of this disclosure.

The core 212 may have any suitable cross-sectional width (e.g., diameter). In some embodiments, the core 212 has a diameter in a range of about 2 mm to about 15 mm, inclusive (e.g., 2, 3, 4, 5, 6, 7, 8, 9, 10, 11, 12, 13, 14, or 15 mm, inclusive), or any other suitable diameter as described in detail with respect to the core 212. In some embodiments, the core 212 may have a glass transition temperature (e.g., for thermoset composites), or melting point of at least about 70 degrees Celsius (e.g., at least 75, at least 80, at least 90, at least 100, at least 120, at least 140, at least 150, at least 160, at least 180, at least 200, at least 220, at least 240, or at least 250, degrees Celsius, inclusive). The glass transition temperature or melting point of the core 212 may correspond to a threshold operating temperature of the conductor 200, which may limit the ampacity of the conductor 200. In other words, a maximum amount of current that can be delivered through the conductor 200 is the current at which the operating temperature of the conductor 200, or at least the temperature of the core 212 is less than the glass transition temperature or melting point of the composite core 212.

In some embodiments, the core 212 defines a circular cross-section. In some embodiments, the core 212 may define an ovoid, elliptical, polygonal, or asymmetrical cross-section. In some embodiments, the strength member 210 may include a single core 212. In other embodiments, the strength member 210 may include multiple cores, for example, 2, 3, 4, or even more, with optionally, the encapsulation layer 214 being disposed around the multiple cores or around each individual core. In such embodiments, each of the multiple cores may be substantially similar to each other, or at least one of the multiple cores may be different from the other cores (e.g., have a different size, different shape, formed from a different material, have components embedded therein, etc.).

In some embodiments, the core 212 is solid, i.e., does not include any holes or voids therein other than a de minimis amount of naturally occurring voids or porosities that may form during a fabrication process of the core 212. In some embodiments, the core 212 may be hollow, for example, define one or more deliberately formed channels or voids therein or therethrough (e.g., extending axially along and/or defined about a longitudinal axis of the strength member 210). Sensing or transmission components may be embedded within the void or channels defined in the core 212. For example, in some embodiments, sensors such as strain gages, accelerometers, or optical fiber sensors may be disposed within, or extend through the core 212. The sensors may be configured to sense various operating parameters of the conductor 200, as described in detail with respect to the core 112.

In some embodiments, the encapsulation layer 214 may be disposed around the core 212, for example, circumferentially around the core 212. In some embodiments, an insulation layer (not shown) may optionally be interposed between the core 212 and the encapsulation layer 214, for example, as described with respect to the conductor 100, and therefore, not described in further detail herein. The encapsulation layer 214 may be formed from any suitable electrically conductive or non-conductive material. In some embodiments, the encapsulation layer 214 may be formed from a conductive material including, but not limited to aluminum (e.g., 1350-H19), annealed aluminum (e.g., 1350-0), aluminum alloys (e.g., Al—Zr alloys, 6000 series Al alloys such as 6201-TSl, -T82, -T83, 7000 series Al alloys, 8000 series Al alloys, etc.), copper, copper alloys (e.g., copper magnesium alloys, copper tin alloys, copper micro-alloys, etc.), any other suitable conductive material, or any combination thereof. In some embodiments, the encapsulation layer 214 is formed from Al and is optionally pretensioned, i.e., is under tensile stress after being disposed on the core 212. The encapsulation layer 214 may be substantially similar to the encapsulation layer 114, and may be formed using any suitable process as described with respect to the encapsulation layer 114.

In some embodiments, the interface between the core 212 and the encapsulation layer 214 may optionally include surface features, for example, grooves, slots, notches, indents, detents, etc. to enhance adhesion, bonding and/or interfacial locking between a radially outer surface of the core 212 and a radially inner surface of the encapsulation layer 214. Such surface features may facilitate retention and preservation of the stress from pretensioning in the encapsulation layer 214. In some embodiments, the composite core 212 may have a glass fiber tow disposed around its outer surface to create a screw shape or twisted surface. In some embodiments, a braided or woven fiber layer is applied in the outer layer of the core 212 to promote interlocking or bonding between the core 212 and the encapsulation layer 214.

In some embodiments, the encapsulation layer 214 may have a thickness in a range of about 0.3 mm to about 5 mm, inclusive, or even higher (e.g., 0.3, 0.5, 1, 1.5, 2.0, 2.5, 3.0, 3.5, 4.0, 4.5, 5.0 mm, inclusive, or even higher). In some embodiments, a ratio of an outer diameter of the encapsulation layer 214 to an outer diameter of the core 212 is in range of about 1.2:1 to about 5:1, inclusive (e.g., 1.2:1, 1.5:1, 2:1, 2.5:1, 3:1, 3.5:1, 4:1, 4.5:1, or 5:1, inclusive).

In some embodiment, the strength member 210 may have a minimum level of tensile strength, for example, at least 600 MPa (e.g., at least 600, at least 700, at least 800, at least 1,000, at least 1,200, at least 1,400, at least 1,600, at least 1,800, or at least 2,000 MPa). In some embodiments, the elongation during pretension of the strength member 210 may include elongation by at least 0.01% strain (e.g., at least 0.01%, at least 0.05%, at least 0.1%, at least 0.15%, at least 0.2%, at least 0.25%, at least 0.3%, at least 0.35%, at least 0.4%, at least 0.45%, or at least 0.5% strain, inclusive) depending on the type of strength members and the degree of knee point reduction, and the strength member 210 may be pre-tensioned before or after entering the conforming machine. Moreover, the strength member 210 may be configured to endure radial compression from crimping of conventional fittings as well as radial pressure during conforming of drawing down process or folding and molding of at least 3 kN (e.g., at least 3, at least 4, at least 5, at least 10, at least 15, at least 20, or at least 25 kN, inclusive), for example, for composite cores 212 with little to substantially no plastic deformation.

In some embodiments, the encapsulation layer 214 may have an outer surface that is configured to be smooth and shiny, for example, may include or be substantially similar to any of the encapsulation layers described in the '726 application. In some embodiments, the outer surface of the encapsulation layer 214 may be surface treated (e.g., plasma treated, texturized, etc.) to have the absorptivity or reflectivity as described above. In some embodiments, the strength member 210, i.e., the outer surface of the encapsulation layer 214 may be optionally coated with an inner coating (not shown) to reduce solar absorptivity. For example, the inner coating may be disposed between the encapsulation layer 214 and the conductor layer 220. Examples of such inner coatings are described in detail in the '726 application and incorporated by reference herein.

The conductor layer 220 is disposed around the strength member 210 and configured to transmit electrical signals therethrough at an operating temperature in a range of 60 degrees to 250 degrees Celsius, inclusive. In some embodiments, the conductor layer 220 may include a plurality of strands of a conductive material disposed around the strength member 210. For example, the conductor layer 220 may include a first set of conductive strands disposed around the strength member 210 in a first wound direction (e.g., wound helically around the strength member 210 in a first rotational direction), a second set of conductive strands disposed around the first set of strands in a second wound direction (e.g., wound helically around the first set of conducive strands in a second rotational direction opposite the first rotational direction), and may also include a third set of strands wound around the second set of strands in the first wound direction, and may further include any number of additional strands as desired.

In some embodiments, the conductor layer 220 (e.g., a plurality of strands of conductive material) may include, for example, aluminum, aluminum alloy, copper or copper alloy including micro alloy as conductive media, etc. In some embodiments, the conductor layer 220 may include conductive strands including Z, C or S wires to keep the outer strands in place. The conductor layer 220 may have any suitable cross-sectional shape, for example, circular, triangular, trapezoidal, etc. In some embodiments, the conductor layer 220 may include a stranded aluminum layer that may be round or trapezoidal. In some embodiments, the conductor layer 220 may include Z shaped aluminum strands. In some embodiments, the conductor layer 220 may include S shaped aluminum strands. In some embodiments, the conductor layer 220 may be substantially similar to the conductor layer 120 or include any conductor layer described in the '726 application.

In some embodiments, the strength member 210 may be optionally tensioned while the conductor layer 220 of aluminum or copper or their respective alloys disposed around the strength member 210 may be applied to cause the conductor 200 to form a cohesive conductive hybrid rod that is spoolable onto a conductor reel. In some embodiments, to facilitate conductor spooling onto a reel and conductor spring back at ease, the conductor 200 may be optionally configured to be non-round (e.g., elliptical) such that the shorter axis (in conductor 200) is subjected to bending around a spool (or a sheaves wheel during conductor installation) to facilitate a smaller bend or spool radius, while the strength members 210 may be configured to have a longer axis facilitate spring back for installation. The overall conductor 200 may be round with non-round strength member 210 or multiple strength members 210 arranged to be non-round, and the spooling bending direction may be along the long axis of the strength member 210 to facilitate spring back while not overly subjecting the conductor layer 220 with additional compressive force from spooling bending.

To further facilitate spooling of the conductor layer 220 on the strength member 210, in some embodiments, the conductor layer 220 may include multiple segments, for example, strands or sets of strands or wires of conductive material (e.g., 2, 3, 4, etc.), and each segment bonded to strength member 210 while retaining compressive stress, and the segments rotates one full rotation or more along the conductor 200 length (equal to one full spool in a reel) to facilitate easy spooling. Thus, the conductor 200 may be configured to have negligible skin effect (i.e., conducting layer thickness is less than the skin depth required at AC circuit frequency), with the strength member 210 may be under sufficient residual tensile stress, and the conductor layer 220 (e.g., each of the strands of the conductive material) are mostly free of tension or under compressive stress. In some embodiments, the strands of the conductive material may be formed from a conforming machine, for example, by extruding hot deformable (e.g., semi solid) conductive material (e.g., aluminum) from a mold. The strands can be molded to be round, trapezoidal, or any other desirable shape. In some embodiments, the extrusion mold or die may have a stranding lay ratio defined therein so that during the stranding operation of the conductive strands, no shaping may be needed (e.g., removing of sharp corners or edges of the conductive strands to avoid corona as is performed in conventional stranding operations). In some embodiments, the conductive media may be extruded out of the mold or die at an angle so as to form conductive strands that wrap around the strength member 210 at an angle, as described herein.

In some embodiments, for AC applications where skin effect is prominent, the conductor layer 220 may include a plurality of layers of conductive strands disposed concentrically around the strength member 210, with each layer being of finite thickness to maximize skin effect for lowest AC resistance at minimal conductor content. In some embodiments, the conductor layer 220 may be optionally stranded to facilitate conductor spooling around a reasonably sized spool and facilitate conductor stringing. In some embodiments, the outer most strands included in the conductor layer 220 may be TW, C, Z, S, or round strands if more aluminum or copper are used, as it will not cause permanent bird caging problem (i.e., the inner strands of the conductor layer 220 may not be deformed such that they prevent the outer strands from proper resettlement after tension is released or reduced). Accordingly, the smooth outer surface and the compact configuration can effectively reduce the wind load and ice accumulation on the conductor 200, resulting in less sag from ice or wind related weather events.

The conductor layer 220 may be under no substantial tension while the strength member 210 may be pre-stretched/tensioned. After the pre-tension in the strength member 210 is released, the conductor layer 220 may be subjected to compression, which may minimize the shrinking back of the strength member 210. The strength member 210 made with composite materials may have a strength above 80 ksi, and a modulus ranging from 5 msi to 40 msi, and a CTE of about $1\times10^{-6}/°$ C. to about $8\times10^{-6}/°$ C., inclusive. In some embodiments, an insulating layer 222 (e.g., a jacket) may optionally be disposed around the conductor layer 220. The insulating layer 222 may be formed from any suitable electrically insulative material, for example, rubber, plastics, or polymers (e.g., polyethylene, PTFE, high density polyethylene, cross-linked high density polyethylene, etc.). The insulating layer 222 may be configured to electrically isolate or shield the conductor 100. In some embodiments, the insulating layer 222 may be excluded.

In some embodiments, an outer surface of the conductor layer 220 (e.g., outer surface of the outermost conductive strands or an outer surface of each of the conductive strands) or the insulating layer is treated with features and/or include features to cause the outer surface to have a solar absorptivity of less than 0.6 (e.g., less than 0.55, less than 0.5, less than 0.45, less than 0.4, less than 0.35, less than 0.3, less than 0.25, less than 0.2, less than 0.15, or less than 0.1, inclusive). In some embodiments, the outer surface has a solar absorptivity of less than 0.55.

In some embodiments, the outer surface of the conductor layer 220 may be treated or otherwise configured to have a reflectivity of less than 50% corresponding to an operating temperature of greater than 90 degrees Celsius, as described in detail with respect to the conductor layer 220. In some embodiments, an outer coating may be disposed on the outer surface of the conductor layer 220 in addition to, or alternatively to the outer surface being treated of the conductor layer, as described herein. The outer coating may include any outer coating as described with respect to the conductor 100 or any outer coating described in the '726 application.

Similar to the conductor 100, the conductor 200 including the conductive core 212 may provide several advantages over comparable conductors that have cores that do not include the plurality of conductive elements 218, that are non-conductive or insulative, or that have a resistance that is at least 2 times of the resistance of the material used to form the conductor layer 220 (e.g., 2× the resistance of aluminum or an aluminum alloy). For example, the conductor 200 may have greater conductivity, greater ampacity, and lesser line loss relative to comparable conductors that do not include a conductive core, without the weight increase and increased sag, for example, as described with respect to the conductor 100.

Figure 4:
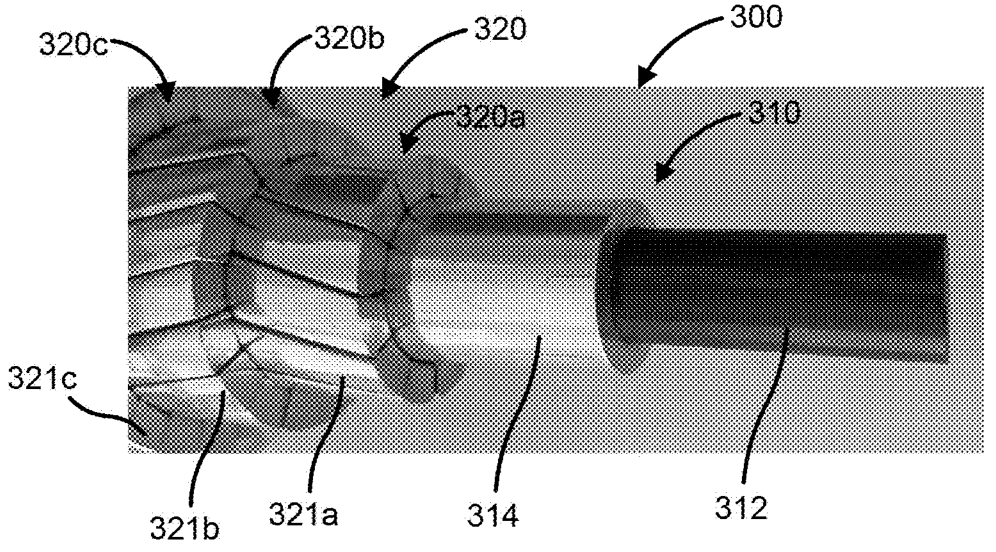
FIG. 4 is a side perspective view of a conductor that includes a strength member having a conductive composite core, and a conductor layer disposed around the strength member, according to an embodiment.

FIG. 4 is a perspective view of a conductor 300, according to an embodiment. The conductor 300 is similar to the conductor 200 and includes a strength member 310 including a core 312 having an encapsulation layer 314, that may be substantially similar to the core 112, 212, and the encapsulation layer 114, 214, respectively, as previously described. The core 312 includes a plurality of conductive elements (e.g., the conductive elements 118 or 218) disposed or included therein, as described herein. The conductor 300 also includes a conductor layer 320 disposed around strength member 310. The conductor 300 includes a conductor layer 320 that includes a first layer **320*a* including first conductive strands 321*a* dispose on the encapsulation layer 314 of the strength member 310, a second layer 320*a* including second conductive strands 321*b* disposed on the first layer 320*b*, and a third layer 320*c* including third conductive strands 321*c* disposed on the second layer 320*b*. Each of the first conductive strands 321*a*, the second conductive strands 321*b*, and the third conductive strands 321*c*** may be formed from aluminum, aluminum alloy, copper or copper alloy including micro alloy as conductive media, any other conductive material or a combination thereof as described herein.

As shown in FIG. 4, the first conductive strands **321*a* include trapezoidal strands that are stranded, disposed, or otherwise oriented on the strength member 310 in a first angular orientation or first wound direction along an axial length of the conductor 300. The second conductive strands 321*b* also include trapezoidal strands that are stranded, disposed, or otherwise oriented on the first layer 320*a* formed by the first conducive strands 321*a* in a second angular orientation or second wound direction that is different from the first orientation or first wound direction (e.g., oriented at an opposite angle to the first orientation) along the axial length of the conductor 300. Moreover, the third conductive strands 321*c* also include trapezoidal strands that are stranded, disposed, or otherwise oriented on the second layer 320*b* formed by the second conducive strands 321*b* in a third angular orientation or third wound direction that is different from the second orientation or second wound direction (e.g., oriented at an opposite angle to the second orientation or in the same or substantially the same orientation as the first orientation) along the axial length of the conductor 300**.

Providing trapezoidal strands allows close packing of the conductive strands **321*a*, 321*b*, 321*c* within their respective conductor layers 320*a*, 320*b*, 320*c* which enables better utilization of the surface area of the conductor 300** for electrical energy transmission. Including multiple layers

320*a*, 320*b*, and 320*c* in the conductor 300 provides multiple paths for electrical energy transmission providing redundancy, and a larger surface area for energy transmission. Moreover, having multiple conductive layers 320*a*, 320*b*, and 320*c* oriented in opposing orientations also increases the mechanical strength of the conductor 300. It should be appreciated that while FIG. 4 shows the conductive strands 321*a*, 321*b*, and 321*c* as having a trapezoidal cross-sectional shape, in other embodiments, the conductive strands 321*a*, 321*b*, and 321*c* may have any other suitable cross-sectional shape, for example, a Z cross-sectional shape, a C cross-sectional shape, a S cross-sectional shape, a circular shape, a triangular shape, any other suitable shape or a combination thereof.

Figure 5:
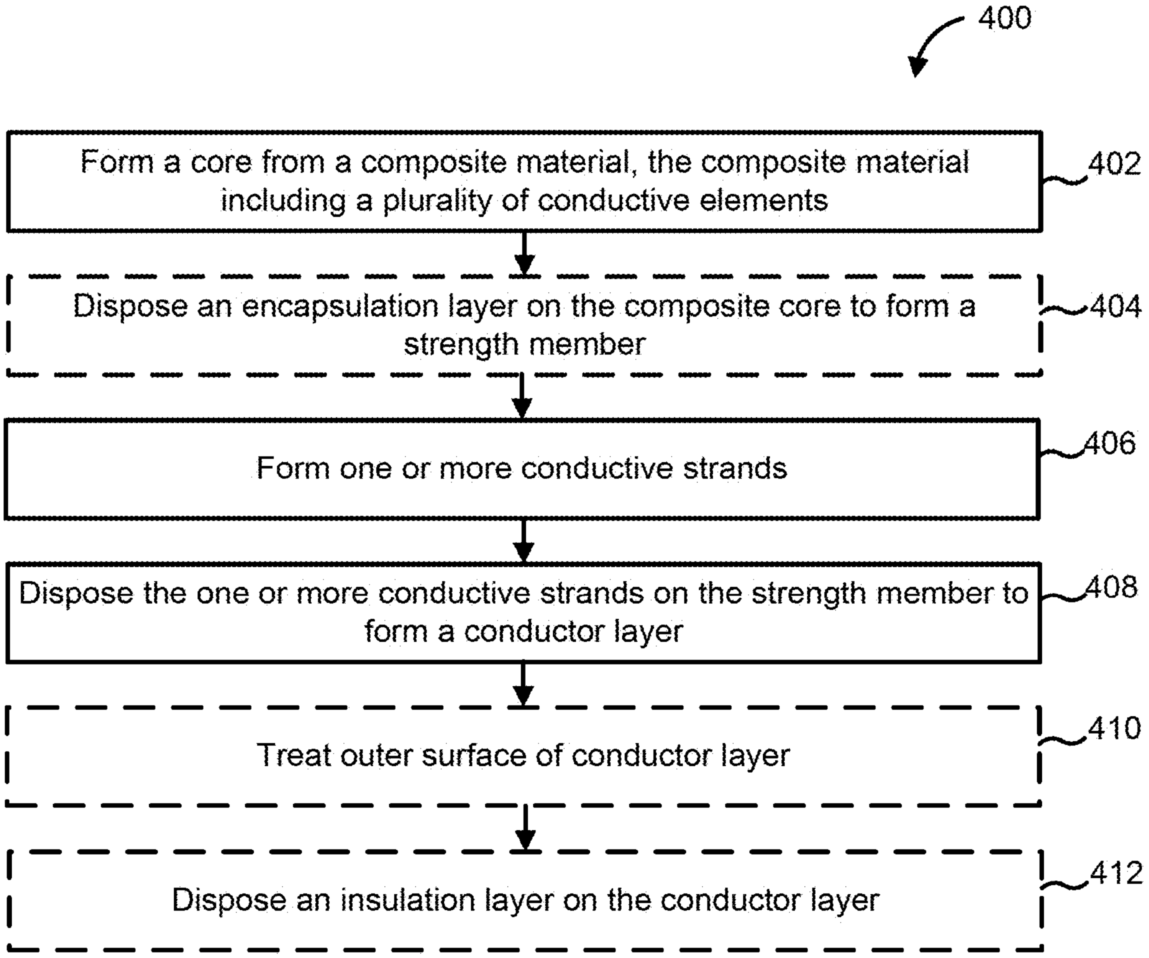
FIG. 5 is a schematic flow chart of a method for fabricating a conductor that includes a strength member including a conductive composite core, and a conductor layer disposed around the strength member, according to an embodiment.

FIG. 5 is a schematic flow chart of a method 400 for fabricating a conductor (e.g., the conductor 100, 200, 300) that includes a strength member (e.g., the strength member 110, 210, 310) having a core (e.g., the core 112, 212, 312) that includes a plurality of conductive elements (e.g., the conductive elements 118, 218) making the core conductive, and a conductor layer (e.g., the conductor layer 120, 220, 320) disposed on the strength member, according to an embodiment. While described with respect to the conductor 100, it should be appreciated that the method can be used to form any composite conductor including a conductive core, as described herein.

The method 400 includes forming the core 112 from a composite material that includes the plurality of conductive elements 118 mixed, disposed, or included therein, at 402. The composite material may include any suitable composite material as described with respect to the conductor 100, and the core 112 may be formed using any suitable method described with respect to the conductor 100. In some embodiments, the core 112 may be formed using pultrusion, which is a combination of pull and extrusion and provides a low cost method for forming the core 112. In other embodiments, the core 112 may be formed using extrusion, casting, any other suitable method or a combination thereof.

In some embodiments, the method 400 may include disposing the encapsulation layer 114 on the composite core 112 to form a strength member. In some embodiments, the encapsulation layer 114 may be formed from a conductive material (e.g., Al, Al alloys, Cu, steel, or any other suitable described herein) or a non-conductive material such as plastics, polymers, rubbers, silicone, etc. Moreover, the encapsulation layer 114 may be disposed around the core 112 using a conforming machine or any other suitable method, as described with respect to the conductor 100.

At 406, one or conductive strands are formed. The conductive strands (e.g., the conductive strands 321*a*, 321*b*, 321*c*) may be formed using conforming, extrusion, or any other suitable process. The conductive strands may be formed from aluminum, aluminum alloy, copper or copper alloy including micro alloy as conductive media, etc. In some embodiments, the conductive strands including Z, C, or S wires to keep the outer strands in place. The conductive strands may have any suitable cross-sectional shape, for example, circular, triangular, trapezoidal, etc. In some embodiments, the conductive strands may be aluminum round or trapezoidal strands. In some embodiments, the conductive strands may include Z shaped aluminum strands. In some embodiments, the conductive strands may include S shaped aluminum strands.

At 408, the one or more conductive strands are disposed on the strength member 110 to form the conductor layer 120, thus forming the conductor 100. The conductive strands may be disposed around strength member 110 using a conforming machine or any suitable method, as described herein. In some embodiments, the conductor layer 120 may include a first set of conductive strands disposed around the strength member 110 in a first wound direction (e.g., wound helically around the strength member 110 in a first rotational direction), a second set of conductive strands disposed around the first set of strands in a second wound direction (e.g., wound helically around the first set of conducive strands in a second rotational direction opposite the first rotational direction), and may also include a third set of strands wound around the second set of strands in the first wound direction. In some embodiments, an outer surface of the conductor layer 120 (e.g., an outer surface of each conductive strand, or a radially outer surface of only the outer most conductive strands included in the conductor layer 120) is treated, at 410, as previously described herein with respect to the conductor 100. In some embodiments, the insulating layer 122 is disposed around the conductor layer 120, at 412.

EXAMPLES

Following are some examples illustrating the benefits of the various embodiments of the composite conductors including strength members having conductive cores described herein. It should be appreciated that these examples are only for illustrative purposes and should not be construed as limiting the disclosure.

A 1 meter gauge length baseline carbon composite core that did not include any conductive elements was formed via pultrusion. The baseline carbon composite core had a diameter of 3.5 mm and a cross-sectional area of 9.6 $mm^2$. The resistance of the baseline carbon composite core was determined to be about 4 ohm. A 1 meter gauge length conductive carbon composite core having a diameter of 3.5 mm and a cross-sectional area of 9.6 $mm^2$, similar to the baseline carbon composite core was formed by incorporating conductive CNT tows in the carbon composite core such that the conductive CNT tows were only about 4% by weight of all fibers (i.e., total number of fibers including the conductive CNT tows and non-conductive fibers) that are included in the conductive composite core, and 2.5% by weight of the entire composition of the conductive composite core by weight. Surprisingly, with such a small addition of the conductive CNT tows in the carbon composite core, the resistance of the conductive carbon composite core reduced to about 1.99 ohm which is less than 50% of the resistance of the baseline carbon composite core which is substantially similar in size, weight and length of the conductive composite core, but does not include the conductive CNT tows. Even more surprisingly, the resistance of an aluminum strand having a 1 meter gauge length, 3.5 mm diameter, and a cross-sectional area of 9.6 $mm^2$ was determined to be about 2.83 ohm, which is higher than the conductive composite core. Thus, addition of only a small amount of CNT tows (or other conductive elements) in a composite core substantially reduces its resistance to be even less than that of a substantially equivalent aluminum strand. Addition of a higher amount of conductive elements (e.g., CNT or graphene conductive fibers, conductive filaments, or conductive tows) may reduce the resistance of the composite core even further.

TABLE 1

Relative conductivities of the baseline carbon composite core, the conductive carbon composite core, and an aluminum strand, each having a length of about 1 meter, a diameter of about 3.5 mm, and a cross-sectional area of about 9.6 $mm^2$.

| S. No. | Core Type | Resistance (Ohm) |
|---|---|---|
| 1. | Baseline carbon composite core (3.5 mm diameter) | 4.0 |
| 2. | Conductive carbon composite core including CNT tows (3.5 mm) | 1.99 |
| 3. | Aluminum strand (equivalent to 3.5 mm outer diameter | 2.83 |

FIG. 6 shows a table that lists various electrical and mechanical properties of example electrical conductors that include conductive composite cores according to the embodiments described herein, relative to conductors that include a non-conductive core, and conventional conductors. Expanding further, as shown in FIG. 6, the electrical characteristics of a composite conductor including a conductive composite core as described herein (TS Conductive), were studied relative to conventional ACSR conductors (ACSR 1/0 Baseline), composite conductors that include a strength member including a non-conductive core and a conductor layer disposed thereon that is covered with an insulation layer (TS Covered), and composite conductors that include a strength member including a non-conductive core and a conductor layer disposed thereon that does not include an insulation layer thereon (TS Bare).

As shown in FIG. 6, the TS Conductive conductor that includes a conductive core by incorporating conductive carbon nanotubes in the core, as described herein, has a resistance that is at least 10% less than the ACSR baseline 1/0 Bare, the TS Covered, and the TS Bare conductors. Moreover, the TS Conductive conductor has a higher ampacity then the ACSR 1/0 Baseline and the TS Bare Conductor at a rated operating temperature of 105 degrees Celsius, and has an ampacity at a maximum temperature of 130 degrees Celsius that is similar to the ampacity of the TS covered conductor. Importantly, the mechanical properties of the TS Conductive conductor such as maximum thermal sag, total pole tension, and rate tensile strength (RTS) are similar to the TS Covered and TS Bare conductors, but the TS Conductive conductor has lower resistance and experiences line losses that are at least 15% less than lines losses experienced by the ACSR, the TS Covered, and TS Bare conductors. This can result in an estimated reduction in line losses over a period of 30 years that can result in cost savings of greater than $1.6 Billion, and an estimated reduction in $CO_2$ reduction over a period of 30 years of greater than 26 Million Megaton (MT).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. An apparatus, comprising:
a strength member, including:
  a core formed of a composite material including conductive elements at least about 75% of the conductive elements disposed within an outer portion of the core, the outer portion including an outer 20% of a radius of the core, the conductive elements configured to cause the outer portion of the core to be electrically conductive; and
  an encapsulation layer disposed around the core, the encapsulation layer formed of an electrically conductive material different from the conductive elements; and
a conductor layer disposed around the strength member.

2. The apparatus of claim 1, wherein the conductive elements include at least one of conductive fibers, conductive filaments, or conductive tows.

3. The apparatus of claim 2, wherein the conductive fibers, the conductive filaments, or the conductive tows include at least one of conductive carbon nanotubes (CNTs) or graphene.

4. The apparatus of claim 3, wherein the conductive CNTs include at least one of single walled CNTs, double walled CNTs, multiwalled CNTs, or graphene coated CNTs.

5. The apparatus of claim 1, wherein a quantity of the conductive elements in the composite core is equal to or less than 50% by weight.

6. The apparatus of claim 5, wherein the quantity of the conductive elements in the composite core is equal to or less than 5% by weight.

7. The apparatus of claim 1, wherein a specific conductivity of the plurality of conductive elements is in a range of about 500 $Sm^2/kg$ to about 10,000 $Sm^2/kg$.

8. The apparatus of claim 1, wherein a ratio of a resistivity of the core including at least one of the plurality of conductive elements to a resistivity of a core that does not include the plurality of conductive elements is equal to or less than 1:10.

9. The apparatus of claim 1, wherein the conductor layer includes a plurality of conductive strands disposed around the strength member.

10. An electrical conductor, comprising;

a strength member, comprising:

an at least partially electrically conductive core including a bulk matrix formed of a composite material, and a plurality of elongate conductive elements embedded in the bulk matrix, at least about 75% of the plurality of elongate conductive elements disposed within less than 20% of a radial distance from an outer surface of the core to a central axis of the core, and an encapsulating layer disposed around the core, the encapsulating layer formed of an electrically conductive material; and a conductor layer disposed around the strength member, the at least partially electrically conductive core causing the electrical conductor to have a resistance of equal to or less than 0.6 ohm/km.

11. The apparatus of claim 10, wherein the plurality of elongate conductive elements include at least one of conductive fibers, conductive filaments, or conductive tows.

12. The apparatus of claim 10, wherein a quantity of the plurality of elongate conductive elements in the composite core is equal to or less than 50% by weight.

13. The apparatus of claim 12, wherein the quantity of the plurality of elongate conductive elements in the composite core is equal to or less than 5% by weight.

14. The apparatus of claim 10, wherein a specific conductivity of the plurality of elongate conductive elements is in a range of about 500 $Sm^2/kg$ to about 10,000 $Sm^2/kg$.

15. The apparatus of claim 10, wherein a ratio of a resistivity of the core including at least one of the plurality of elongate conductive elements to a resistivity of a core that does not include the plurality of elongate conductive elements is equal to or less than 1:10.

16. The apparatus of claim 10, wherein the strength member further comprises:

conductive fillers or conductive additives included in core, and being in electrical communication with the plurality of elongate conductive elements.

* * * * *